United States Patent [19]

Umemura et al.

[11] Patent Number: 5,933,623

[45] Date of Patent: Aug. 3, 1999

[54] SYNCHRONOUS DATA TRANSFER SYSTEM

[75] Inventors: Masaya Umemura, Fujisawa; Toshitsugu Takekuma, Ebina, both of Japan

[73] Assignee: Hitachi, Ltd., Tokyo, Japan

[21] Appl. No.: 08/736,212

[22] Filed: Oct. 25, 1996

[30] Foreign Application Priority Data

Oct. 26, 1995 [JP] Japan .................................. 7-279146

[51] Int. Cl.[6] .................................................. G06F 15/163
[52] U.S. Cl. ...................................... 395/551; 395/200.62
[58] Field of Search .................................... 395/551, 559, 395/200.78, 200.83, 800.28, 200.62, 881

[56] References Cited

U.S. PATENT DOCUMENTS

| | | | |
|---|---|---|---|
| 4,885,538 | 12/1989 | Hoenniger, III et al. ................ | 324/312 |
| 5,530,884 | 6/1996 | Sprague et al. ................. | 395/800.28 X |
| 5,548,226 | 8/1996 | Takekuma et al. ......................... | 326/30 |
| 5,634,070 | 5/1997 | Robinson ............................ | 395/800.28 |

*Primary Examiner*—Thomas M. Heckler

*Attorney, Agent, or Firm*—Antonelli, Terry, Stout & Kraus, LLP

[57] ABSTRACT

A synchronous data transfer system includes an oscillation circuit and a plurality of nodes connected to the oscillation circuit. Each node includes at least an internal logic circuit. Each of the nodes outputs a phase reference signal indicating phase of the clock signal, data processed by the internal logic circuit in response to the phase reference signal, and a transfer end signal indicating an end of transferring the data, respectively, in synchronism with the clock signal. A phase reference signal bus is connected to each node. A data bus is connected to each node for transmitting the data and a transfer end signal bus is connected to each node for transmitting the transfer end signal. A sender node includes a sending unit for sending data to a receiver node with a delay after the phase reference signal transmitted to the phase reference signal bus by the sender node, and sending simultaneously the transfer end signal to the receiver node. The receiver node includes a selecting unit for converting the phase reference signal into phase information to select a clock signal having a predetermined phase based on the received clock signal and a receiving unit for receiving data from the sender node using the selected clock signal.

41 Claims, 24 Drawing Sheets

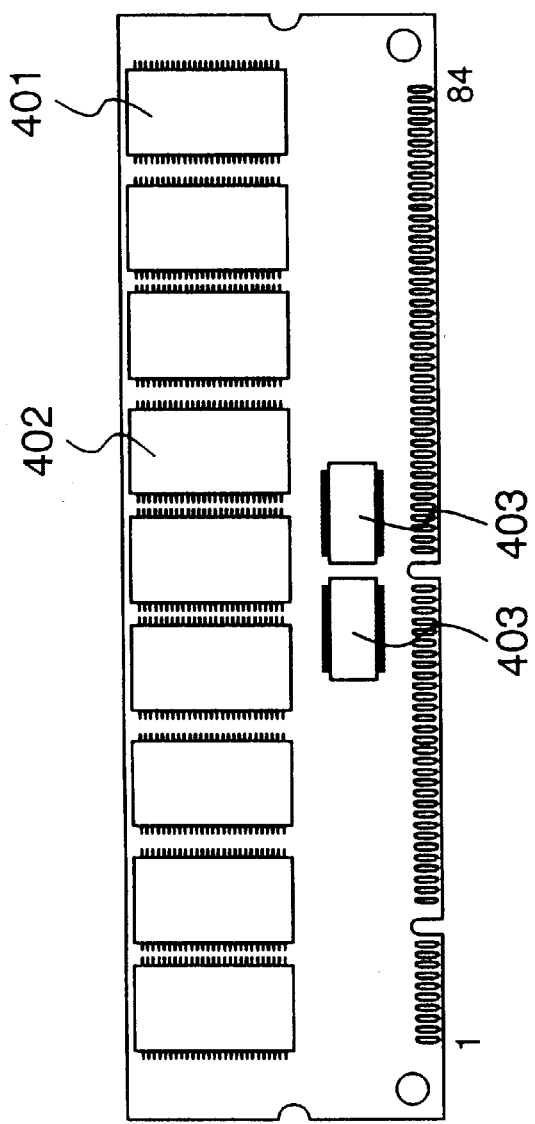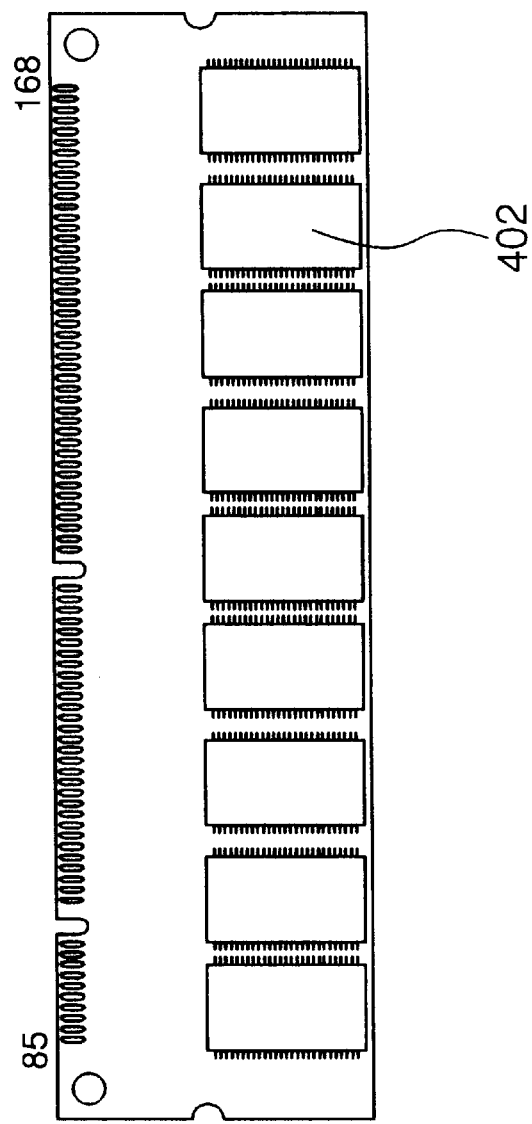
FIG. 17A
FIG. 17B

SYNCHRONOUS DATA TRANSFER SYSTEM

BACKGROUND OF THE INVENTION

The present invention relates to a synchronous data transfer system for an information processing system.

In conjunction with the synchronous data transfer system, there is known such an arrangement in which a reference clock is supplied to each of nodes of the system, wherein a given phase of the reference clock and a succeeding phase thereof which succeeds to the given phase are made use of in such a manner that a sender terminal or node starts to output the data in the given phase while a receiver terminal or node fetches the outputted data in the succeeding phase.

Further there is known such a synchronous data transfer system in which a reference clock is supplied to each of nodes provided in the system, wherein a given phase of the reference clock is utilized by a sender terminal or node for starting the output of data, while in a receiver terminal or node, edge of the data arrived is detected and the data is fetched on the basis of the detected edge.

Besides, there is also known such a synchronous data transfer system in which a reference clock is supplied to each of nodes provided in the system, wherein a sending terminal starts to output data in a given phase of the reference clock while outputting additionally a reception-dedicated clock which is delayed in consideration of the time for which the data remains valid in flip-flop circuits of the receiver terminal so that the receiver terminal or node fetches the data arrived on the basis of the reception-dedicated clock.

As the literature disclosing the relevant technologies, there may be mentioned U.S. Pat. No. 5,548,226. Further, reference may be made to "ELECTRONICS", July, 1993, pp. 5–6 and "NIKKEI ELECTRONICS", Sep. 27, 1993, pp. 269–290 as well.

SUMMARY OF THE INVENTION

An object of the present invention is to provide a synchronous data transfer system which allows a data cycle for transferring data to be shortened or, to say in another way, a synchronous data transfer system which allows an operation frequency of a bus system to be increased without encountering any appreciable difficulty by taking advantage of shortening of delay in circuit operation owing to the progress in the semiconductor circuit technology.

Further, it is another object of the present invention to provide a synchronous data transfer system which is capable of enhancing throughput of the synchronous data transfer so that the ratio at which the effective data transfer cycle occupies the whole data transfer cycle can approach to 100% as close as possible.

A first aspect of the present invention incarnated in the preferred embodiments thereof as described hereinafter provides a synchronous data transfer system which includes an oscillation unit for generating a clock signal for a predetermined transfer cycle for data transfer, and a plurality of nodes connected to the oscillation unit. Each node includes at least an internal logic circuit for performing a predetermined data processing. Further, each of the nodes outputs a phase reference signal indicating phase of the clock signal, data processed by the internal logic circuit provided internally of the node in response to the phase reference signal and a transfer end signal indicating an end of transferring the data processed by the internal logic circuit, respectively, in synchronism with the clock signal. A phase reference signal bus is connected to each of the plural nodes for transmitting the phase reference signal. A data bus is connected to each of the plural nodes for transmitting the data and a transfer end signal bus is connected to each of the plural nodes for transmitting the transfer end signal. A sender node of the plural nodes includes a sending unit for sending data to a receiver node of the plural nodes through the data bus with a delay from the phase reference signal transmitted to the phase reference signal bus by the sender node, and sending simultaneously the transfer end signal to the receiver node through the transfer end signal bus. The receiver node includes at least a selecting unit for converting the phase reference signal received into phase information to thereby select a clock signal having a predetermined phase in response to the clock signal received by the receiver node and a receiving unit for receiving the data from the sender node by using the clock signal selected. By virtue of the arrangement of the synchronous data transfer system described above, not only the time required for the transfer of the phase reference signal but also the time required for the selection of latch clock can be covered by the data transfer cycle to be thereby pipelined. This is accomplished because the phase reference signal, the data and the transfer end signal are employed and sequenced upon sending thereof with the phase reference signal on one hand and the data and the transfer end signal on the other hand being separated from each other. Thus, there can be realized a synchronous data transfer system which can enjoy a high throughput.

In the synchronous data transfer system, the transfer cycle mentioned above may be so determined as to be shorter than a total sum of a propagation delay time involved between said sender node and said receiver node, a delay time of an output circuit provided internally of said sender node and a delay time of an input circuit provided internally of said receiver node, wherein said phase reference signal, said data and said transfer end signal are outputted from said sender node to said receiver node in synchronism with the clock signal for the determined transfer cycle mentioned above. By virtue of the arrangement described above, it is possible to increase the operation frequency of the synchronous data transfer system by taking advantage of enhanced operation frequency owing to the progress in the semiconductor technology.

In the synchronous data transfer system, the operation frequency of the clock signal for said transfer cycle is so determined as to bear a relation given by an integral ratio relative to the operation frequency of said internal logic circuits incorporated in said sender node and said receiver node, respectively. With the arrangement mentioned above, the data to be received by the receiver node can arrive at the semiconductor chip constituting the receiver node with a specific data pattern for every integral ratio, whereby the data can easily be synchronized with the clock generated internally of the semiconductor chip because of the relation given by the integral ratio between the operation frequency of the bus clock signal and the operation frequency of the internal logic circuit incorporated in the semiconductor chip. Thus, there is realized a synchronous data transfer system which can operate at a high speed while facilitating the synchronization.

In the synchronous data transfer system, there may further be provided a bus privilege arbitration unit connected to said sender node for outputting to the sender node an arbitration cycle for bus privilege authorizing use of the phase reference signal bus, the data bus and the transfer end signal bus mentioned above, wherein said arbitration cycle is so established that when said sender node receives said transfer end signal from said bus privilege arbitration unit, the bus privilege authorizing the use of said phase reference signal bus, said data bus and said transfer end signal is assigned to said sender node, and wherein upon assigning of said bus privilege from said bus privilege arbitration unit, said sender node sends out the phase reference signal onto said phase reference signal bus, then the data onto said data bus and then the transfer end signal onto said transfer end signal bus. Owing to the arrangement such that the bus privilege, i.e., the right to use the bus, is assigned to the semiconductor chip in response to the transfer end signal, whereupon the phase reference information is transferred from the semiconductor chip acquired the bus privilege while the data is transferred from the semiconductor chip assigned the bus privilege as described above, the time required for the transfer of the phase reference signal and the time taken for selection of the latch clock can be covered or masked with the data transfer cycle to be thereby pipelined, so to say. Thus, there can be realized a synchronous data transfer system which can ensure high throughput.

In the synchronous data transfer system, the aforementioned arbitration cycle is covered by the transfer cycle for the data transferred from said sender node assigned with the bus privilege, while the transfer cycle for the phase reference signal from said sender node assigned with the bus privilege is covered by the transfer cycle for the data transferred from said sender node assigned with the bus privilege. With the arrangement in which the bus privilege arbitration cycle, the transfer of the phase reference signal and selection of the latch clock are masked or covered by the data transfer cycle, as described above, the bus privilege arbitration cycle, the transfer of the phase reference signal and the selection of the latch clock are pipelined, so to say, which in turn means that the bus cycle is substantially equal to only the data transfer cycle, whereby the synchronous data transfer system of high throughput can be realized.

A second aspect of the invention is seen in a synchronous data transfer system which includes an oscillation unit for generating a clock signal for a predetermined transfer cycle for data transfer, a plurality of nodes connected to said oscillation unit and each including at least an internal logic circuit for performing a predetermined data processing, each of said nodes outputting a phase reference signal indicating phase of said clock signal, data processed by said internal logic circuit provided internally of said node in conformance with said phase reference signal and a transfer end signal indicating an end of said data transfer, respectively, in synchronism with said clock signal, and at least a phase reference signal bus for transmitting said phase reference signal, a data bus for transmitting said data and a transfer end signal bus for transmitting said transfer end signal, said phase reference signal bus, said data bus and said transfer end signal bus being connected to each of said plurality of nodes, respectively, each of said plurality of nodes includes a PLL (Phase-Locked Loop) circuit operating in synchronism with said clock signal for generating a frequency-multiplied clock signal from said clock signal to thereby derive as output a polyphase clock signals having a same period as that of said clock signal, said polyphase clock signals having respective phases differing from one to another on a period-by-period basis of said frequency-multiplied clock signal, a first sending unit provided at least in said sender node of said plurality of nodes for sending said phase reference signal from said sender node to the receiver node by way of said phase reference signal bus, a latch clock selecting unit provided at least in said receiver node for selecting a latch clock signal from said polyphase clock signals generated by said phase-locked loop circuit on the basis of said received phase reference signal, a second sending unit provided at least in said sender node for sending the data to said receiver node by way of said data bus with a delay relative to said sent phase reference signal, a third sending unit provided at least in said sender node for sending said transfer end signal to said receiver node substantially simultaneously with said second sending unit and a receiving unit provided at least in said receiver node for receiving said data from said data bus by using said latch clock signal. By virtue of the arrangement in which the phase-locked loop circuit is provided for generating a frequency-multiplied clock signal from the input clock signal and then outputting the polyphase clock signals having the respective phases differing on a period basis of the frequency-multiplied clock in synchronism with the aforementioned clock signal, as described above, the skew of the clock distribution channel extending from the phase-locked loop circuit to the latch unit can be cancelled out. Such action is effective for each of the phases outputted from the phase-locked loop circuit. Owing to the reduction of the skew, the data transfer cycle can theoretically be decreased to the time for which the data is effective in the flip-flop circuit of the receiving node.

In the synchronous data transfer system, said latch clock selecting unit may include an edge detecting unit for detecting an edge of said received phase reference signal to thereby convert the detected edge information into phase information, a clock selecting unit for selecting from said phase information the clock signal for receiving the data via said data bus to thereby output the selected clock signal as clock selection information, a clock change-over switch for selecting from said clock selection information said polyphase clock signal generated by said phase-locked loop circuit to thereby supply said latch clock signal to a latch unit provided internally of said receiver node, and a reset circuit for resetting said clock selecting unit on the basis of said transfer end signal. With the arrangement in which the latch clock signal is selected from a plurality of clock signals generated by the phase-locked loop circuit on the basis of the phase reference signal, as described above, the skew of the latch unit can be reduced. Furthermore, when compared with a system configuration in which a phase-locked loop circuit is provided for thereby controlling the phase of the clock signal by controlling the voltage of the phase-locked loop circuit, the phase reference signal may be constituted by a single-shot pulse. Thus, the time required for the selection of the latch clock signal can be shortened without fail. Besides, in the case where a plurality of phase-locked loop circuits are provided in the semiconductor chip, there may occur resonating oscillation between the phase-locked loop circuits, incurring erroneous operation of the semiconductor chip itself. Thus, it can be said that the system according to the present invention has a high error-proof property.

In the synchronous data transfer system, the edge detecting unit mentioned above may include a sampling circuit for sampling said phase reference signal with said polyphase clock signal, and the edge detecting circuit for detecting an edge of an output signal from said sampling circuit. By virtue of the arrangement in which the edge detecting unit is constituted by the sampling circuit and the edge detection circuit, i.e., constituted by digital circuits, implementation of the edge detecting unit with CMOS (Complementary Metal Oxide Semiconductor) transistors can be facilitated. In other words, when compared with the case of implementation in the form of an analogue circuit, not only noise resistance property and sampling accuracy can be enhanced but also such problems as the oscillation due to resonance with the phase-locked loop circuit, high power consumption and the necessity for implementation in a large scale circuit can be avoided.

In the synchronous data transfer system, said sampling circuit including a number of latch circuits which corresponds to the number of the phases of said polyphase clock signals generated by said phase-locked loop circuit, wherein said phase reference signal is outputted after having been latched by said latch circuit. By virtue of the arrangement in which the sampling unit is constituted by a number of latch units which is equal to the number of the phases of the plural clocks generated by the phase-locked loop circuit, as described above, the latch unit having an ordinary operating speed can be made use of, whereby circuit configuration can be simplified, which in turn facilitates the circuit designing. Besides, the phase information can easily be derived, while a high-speed operation of the circuit as a whole can ensured.

In the synchronous data transfer system, the aforementioned edge detecting circuit may be so implemented as to detect said edge by comparing a number of the outputs of said latch circuits corresponding to the number of the phases of said sampling circuits, to thereby convert the detected edge into the phase information. With the above-mentioned arrangement in which the outputs of the sampling circuit are compared for detecting the edge to be converted into the phase information described above, the circuit configuration can be simplified with the circuit designing being facilitated while ensuring a high speed operation.

In the synchronous data transfer system, the aforementioned clock selecting unit may include a phase information hold circuit for holding said phase information, a selector for outputting said clock selection information in accordance with said phase information, and a waveform shaper for shaping said clock selection information, wherein said clock selection information is outputted only during a period in which data is valid in the transfer cycle for transferring the data by way of said data bus. With the arrangement in which the clock selecting unit is constituted by the phase information hold circuit, the selector and the waveform shaper, as described above, the clock selecting information can be outputted only during the period in which the relevant data is valid or effective in the data transfer cycle. Thus, the relevant data can be latched without fail while excluding the latch operation in the state where the data transfer is not effected, whereby erroneous operation can be prevented.

In the synchronous data transfer system, the aforementioned phase information hold circuit may be so implemented as to hold said phase information delivered from said edge detecting unit, while outputting said hold state to said reset circuit for resetting said clock selecting unit, said hold state being cleared by the reset signal outputted from said reset circuit. Owing to the arrangement in which holding and resetting of the phase information are effectuated in the manner described above, the relevant data being transferred can positively be latched with the latch clock signal selected from the phase information. Besides, because the phase information is reset upon reception of the transfer end information concurrently with the data transfer, the latch operation is prevented unless the relevant data is being transferred, as a result of which erroneous operation can be prevented.

In the synchronous data transfer system, the aforementioned latch clock selecting unit may be implemented as to include a plurality of said clock selecting units which are changed over to one to another on the basis of said transfer end signal, and a reset circuit for controlling change-over of the latch clock signal to be supplied to said clock change-over switch. With the arrangement in which the change-over unit is provided for the clock selecting units, as described above, it is possible to control the change-over of the latch clock signal to be supplied to the clock change-over switch, whereby the phase information can be held and changed over in accordance with the bus privilege assigning sequence without confliction on the basis of the transfer end operation signal even in the state where lots of bus use requests are issued. Thus, the transfer of the phase reference signal and the selection of the latch clock can be covered by the data transfer cycle, to allow the pipeline to be realized.

The synchronous data transfer system may further include a phase securing circuit connected to said phase reference signal bus, said data bus and said transfer end signal bus for allowing respective waveforms propagating through said buses to rise and/or fall uniformly, to thereby reduce variance in the phase among said propagating waveforms. By virtue of the above-mentioned arrangement, the rising and/or falling of the propagating waves can be uniformized, whereby the phase of the phase reference signal can be held substantially at a same position so long as the phase reference signal outputted from one and the same semiconductor chip is concerned. Thus, the stable operation of the synchronous data transfer system can be realized.

In the synchronous data transfer system, the aforementioned phase securing circuit may include terminating resistors each provided at an end of each of said buses, and matching resistors each connected between each of said nodes and each of said buses, respectively, wherein said terminating resistor has a resistance value coinciding with characteristic impedance of the associated one of said buses, while said matching resistor has a resistance value for securing difference between characteristic impedance of associated one of said nodes and characteristic impedance at a connection of said associated bus as viewed from the side of said one node. Owing to the arrangement of the phase securing circuit in which each of the terminating resistors has the resistance value which coincides with the characteristic impedance of the associated bus while each of the matching resistors has a resistance value which secures difference between the characteristic impedance of the associated stub and the characteristic impedance of the connecting point of the associated bus as viewed from the stub, the rising and/or falling of the propagating waves can be uniformized.

In the synchronous data transfer system, such arrangement may be adopted that at least one of said plurality of nodes connected to said phase reference signal bus, said data bus and said transfer end signal bus serves as a bus master with the remaining nodes serving as bus slaves, respectively, wherein said bus master controls said bus slaves by acquiring said bus privilege for said buses, respectively. With the arrangement in which the control of the bus slave by the bus master is realized with such relation that the sender node serves as the bus master with the receiver node serving as the slave, as described above, the control logics can be realized collectively in the bus master, which is advantageous for implementation of the synchronous data transfer system at a low cost.

The synchronous data transfer system may include only the phase reference signal bus and the data bus with the transfer end signal bus being spared, wherein end of the transfer is detected by comparing a data transfer length determined previously in the transfer system with a value obtained by counting a series of transferred data lengths received by said receiver node. By virtue of the arrangement described above, the signal line for the transfer end signal can be spared in the system in which the data length for the transfer or the burst length is known or determined definitely, as a result of which the number of pins can be decreased even in a large-scale integrated circuit, whereby the synchronous data transfer system can be realized at low cost.

In the synchronous data transfer system, such arrangement may be adopted in which the node which does not participate in the data transfer by way of said bus detects the end of the data as transferred by comparing the data length determined previously for the data transfer in the transfer system with a value obtained by counting a series of data lengths transferred through said data bus. By virtue of the arrangement described above, the node to which the bus privilege (i.e., bus use authorization) is to be next assigned can know in precedence the time point at which the preceding data transfer will end in the system in which the bus privilege arbitration is pipelined, whereby overhead involved in monitoring the transfer end signal till the start of the data transfer can be mitigated.

In the synchronous data transfer system, the aforementioned bus privilege arbitration unit may be so arranged as to detect the end of the data transfer by comparing the data length determined previously for the data transfer in the transfer system with a value obtained by counting a series of lengths of the data transferred through said data bus. Owing to the arrangement described above, the node which is to acquire next the bus privilege can know in precedence the time point at which the current data transfer will end, whereby overhead involved in monitoring the transfer end signal till the start of the data transfer can be reduced.

In the synchronous data transfer system, the aforementioned bus privilege arbitration unit may be so implemented as to assign the bus privilege to the sender node after detection of the end of the data transfer. By virtue of the arrangement described above, the bus arbitration unit can know in precedence the time point at which the preceding data transfer will end in the system in which the bus privilege arbitration is pipelined, whereby the bus arbitration unit can proceed with the bus arbitration in advance. Besides, overhead involved in monitoring the transfer end signal for messaging the bus use authorization to the node to which the bus privilege is to be assigned in succession can be reduced.

A further aspect of the present invention is seen in a synchronous data transfer system which includes a plurality of first nodes for storing data and a second node for controlling said first nodes, wherein said first nodes and said second node are connected to an address bus for transferring addresses of said first nodes, a command bus for transferring a signal indicating said first node subjected to read/write operation, a control bus for transferring a signal for controlling said first node on the basis of a clock signal, a clock bus for transferring the clock signal for operating said first node, a loop-back clock bus through which said first node transfers the clock signal by return upon reception of said clock signal and a data bus for transferring data. With the arrangement in which the loop-back clock bus for returning the clock signal by way of the clock bus from the first node is provided, the synchronous data transfer can be realized.

In the synchronous data transfer system, the aforementioned first node may include at least one synchronous memory and one address buffer, said address buffer having input side to which said address bus, said command bus, said control bus and said clock bus are connected, while the output side of said address buffer being connected to said synchronous memory by way of an address bus, a command bus, a control bus and a clock bus extending from said buses, respectively, and provided internally of said first node, to thereby allow the signal received at the input side of said address buffer to be transmitted to said synchronous memory, wherein in said synchronous memory, data on the address bus, the command bus and the control bus, respectively, and data on the data bus are latched with the clock signal transmitted from said second node by way of said clock bus. With the arrangement described above, the address, command and control signals can once be received by the address buffer in each of the first nodes to be subsequently distributed to the synchronous memory on the first node. Thus, the propagation delay time involved between the second node and the memory can be shortened while the phases of the address, command and the control signals and that of the data to be written can be aligned at the position of the synchronous memory.

In the synchronous data transfer system, the aforementioned second node may be so arranged as to selectively control said first nodes to thereby execute data read/write operation for said synchronous memory and data read/write operation for a register incorporated in a sequencer provided in said synchronous memory by way of said data bus, wherein write operation for said synchronous memory and write operation for said register are executed in synchronism with the clock signal transmitted through said command bus. Owing to the arrangement described above, the second node can send to the synchronous memory the address, command and control signals and the data to be written in timing with the clock signal, whereby the data write operation can be realized at a high speed with a repetition cycle without being influenced by the positional relation between the second node and the memory, i.e., the propagation delay time.

In a synchronous data transfer system, the aforementioned synchronous memory may be constituted by at least one selected from a group consisting of a synchronous dynamic random access memory (synchronous DRAM), a synchronous graphic random access memory (SGRAM) and a synchronous static random access memory (synchronous SRAM). Thus, the commercially available synchronous DRAM, SGRAM and synchronous SRAM can be used as the synchronous memory, whereby the memory system can be implemented inexpensively when compared with the synchronous memory added with especial functions.

In the synchronous data transfer system, the aforementioned address buffer incorporated in the first node may be imparted with a function for detecting read operation for reading the data sent from said second node and received at the input side of said address buffer as well as read operation for said register of said sequencer provided in said synchronous memory, to thereby send out onto said loop-back clock bus the clock signal corresponding to a single or plural cycles of said clock bus in dependence on the results of said detection. With the arrangement described above, the synchronous data transfer in the read operation can be realized solely by providing for the address buffer which is inherently different from the synchronous memory the decoders for the address, command and control signals. Thus, the commercially available synchronous DRAM, SGRAM and synchronous SRAM can be used, whereby the memory system can be implemented inexpensively when compared with the synchronous memory added with especial functions.

In the synchronous data transfer system, the aforementioned first node may be so arranged as to send a series of the read-out data onto the data bus in accordance with a CAS (column address strobe) latency and the predetermined data transfer length written in the register incorporated in the sequencer provided in said synchronous memory with a delay relative to the loop-back clock signal sent onto said loop-back clock bus. In this manner, by sending the loop-back clock from the first node to the second node upon read operation, reestablishment of the synchronization at the second node can be facilitated.

In the synchronous data transfer system, the aforementioned second nodes may be so implemented as to include a phase-locked loop circuit operating in synchronism with a predetermined clock signal for generating a frequency-multiplied clock signal from said clock signal to thereby derive as output polyphase clock signals having a same period as that of said clock signal, said polyphase clock signals having respective phases differing from one to another on a period-by-period basis of said frequency-multiplied clock signal, wherein said second node may include a clock selecting circuit for referencing the phase of the loop-back clock signal sent from one node of said plurality of first nodes by way of said loop-back clock bus, to thereby select a latch clock signal from the polyphase clock signals generated by said phase-locked loop circuit on the basis of said phase in order to receive the data from said one first node. With the arrangement in which the latch clock signal is selected from a plurality of clock signals generated by the phase-locked loop circuit on the basis of the phase reference signal, as described above, the skew of the latch unit can be reduced.

In the synchronous data transfer system, the aforementioned first node may be so implemented as to include at least one said synchronous memory and one said address buffer, wherein said second node holds the set CAS latency written in the register incorporated in the sequencer provided in said synchronous memory, for thereby aligning a time point for starting to latch the data received through said address buffer from said synchronous memory with said selected latch clock signal in accordance with said set CAS latency. Owing to the arrangement mentioned above, the phase information can be extracted from the preceding clock at the second node for thereby estimating the time point to start the latch of the read-out data after selection of the latch clock for the read-out data. Thus, the synchronous data transfer system can be protected against error and failure due to loss of the leading read-out data.

In the synchronous data transfer system, the aforementioned second node may be so arranged as to hold the set data transfer length written in said register of said synchronous memory to thereby latch said data by a number of cycles corresponding to said data transfer length from a time point for starting latching of the data received from said synchronous memory by way of said address buffer in accordance with said set data transfer length held by said register. By virtue of the arrangement described above, the transfer length or burst length of the read-out data can be known in advance or determined definitely at the second node. Thus, the synchronous data transfer system can be protected against error and failure due to loss of the read-out data.

In the synchronous data transfer system, the aforementioned second node may be so implemented as to include a counter operating in synchronism with said selected latch clock in order to align a time point for starting to latch said received data with a leading cycle of the data received from said synchronous memory through said address buffer. With the above arrangement, the counter can operate with the clock for latching the read-out data. Thus, the count-down operation up to the time point for latching the read-out data as well as the counting operation for counting the transfer length of the data being currently received can be carried out with high accuracy. Besides, the synchronous data transfer system can be protected against error and failure due to loss of the read-out data.

In the synchronous data transfer system, the aforementioned second node may be implemented as to include a bus privilege arbitration unit for controlling bus privilege for said address bus, said command bus, said control bus, said clock bus and said loop-back clock bus, wherein said bus privilege arbitration unit is inhibited from authorizing the bus privilege of said buses for a succeeding data transfer unless signal potentials of said buses have resumed respective high impedance state outputting no data after a series of data transfers between given ones of said plurality of nodes having been completed by using said buses so that no data transfer confliction can occur on said bus or buses shared in common. With the arrangement described above, a blank cycle can be provided for the time taken for the bus signal potential to resume the high-impedance state, i.e., for the propagation delay time, for each of the buses constituting the synchronous data transfer system. Thus, the system can be protected against errors and faults.

In the synchronous data transfer system, the aforementioned address buffer may include a combination of at least a phase-locked loop circuit (PLL circuit), a register and a sequencer. By virtue of the arrangement described above, the address buffer connected to the address bus, the command bus, the control bus and the clock bus is provided with the phase-locked loop circuit, the register and the sequencer. Thus, the address buffer can know the operating state of the synchronous memory which receives the address, command and control signals from the address buffer without need for the address buffer itself to inquire the synchronous memory of the operating state thereof.

In the synchronous data transfer system, the aforementioned register of said address buffer may be so arranged as to cooperate with said register incorporated in the sequencer provided internally of said synchronous memory for writing data in the register of said address buffer simultaneously with write operation for setting the register of said synchronous memory. Owing to the arrangement described above, the process which the synchronous memory follows in the transition of operation state thereof can be recognized in detail, because the aforementioned register of the address buffer is so arranged as to be same as the register of the synchronous memory for writing data in the register of said address buffer simultaneously with write operation for setting the register of the synchronous memory.

In the synchronous data transfer system, the register of the aforementioned address buffer may be provided separately from the register incorporated in said synchronous memory so that the data transfer length may be written in the register of said address buffer in accordance with a procedure differing from a write procedure for the register of said synchronous memory. With the arrangement described above, the operation mode specific to the address buffer can be set up independently because the register of the address buffer differs from that of the synchronous memory.

In the synchronous data transfer system, the sequencer of the aforementioned address buffer may be so arranged as to reference the data transfer length written in the register of said address buffer to operate in synchronism with the clock signal inputted to said address buffer by way of said clock bus or in synchronism with a polyphase clock signal outputted from said phase-locked loop circuit to which said clock signal is inputted. With the above arrangement, the sequencer of the address buffer can reference the contents written in the register so as to operate in synchronism with the clock signal inputted to the address buffer or in synchronism with the clock outputted from the phase-locked loop circuit to which the clock signal is inputted. Thus, the transition of the operation state of the synchronous memory can be detected while suppressing simultaneously the delays due to skew and jitters.

In the synchronous data transfer system, the aforementioned address buffer may be so arranged as to reference the data transfer length written in the register of said address buffer to operate in synchronism with a polyphase clock signal outputted from said phase-locked loop circuit in response to said clock signal inputted thereto through said clock bus, to thereby detect the state of said synchronous memory by transiting operation state of said synchronous memory to either one of one-to-one or one-to-plurality or plurality-to-one operation state. With the arrangement described above, the address buffer can make transition of the operation state in correspondence to the state of the synchronous memory by referencing the contents placed in the register of the address buffer. Thus, the state of the synchronous memory can easily be detected or identified.

In the synchronous data transfer system, the aforementioned address bus, the command bus, the control bus and the clock bus may be connected to the input side of said address buffer, while the sequencer of said address buffer may be connected to all of said buses. Because the address bus, the command bus, the control bus and the clock bus are connected to one side of the address buffer, the sequencer incorporated in the address buffer is connected to all the buses. Thus, the sequencer can recognize the write operation for the register of the synchronous memory as well as the read/write command.

In the synchronous data transfer system, the phase-locked loop circuit of the aforementioned address buffer may be so implemented as to generate a frequency-divided clock from said polyphase clock signal inputted to said phase-locked loop circuit or a frequency-multiplied clock thereof to thereby output selectively said frequency-divided clock or said frequency-multiplied clock. With the arrangement described above, the phase-locked loop circuit of the address buffer can generate and output the frequency-divided clock or the frequency-multiplied clock selectively. Thus, the frequencies of the clock signal and the loop-back clock signal transferred through the clock bus and the loop-back clock bus can each be imparted with a degree of freedom.

In the synchronous data transfer system, minimum repetition frequencies of the aforementioned address bus, the command bus, the control bus and the data bus, respectively, a repetition frequency of the clock signal transmitted through the clock bus and a repetition frequency of the clock signal transmitted through the loop-back clock bus may be so set as to bear a relation given by an integral ratio to one another. By setting the minimum repetition frequencies of the address bus, the command bus, the control bus and the data bus, respectively, the repetition frequency of the clock signal transmitted through said clock bus and the repetition frequency of the clock signal transmitted through said loop-back clock bus so as to bear a relation given by an integral ratio, the repetition frequencies on the clock bus and the loop-back clock bus can be aligned with the upper limit frequencies of the address bus, the command bus and the control bus. Thus, there exists no more bus which requires significantly high repetition frequency, as a result of which the operation frequency performance of the synchronous data transfer system can be enhanced.

In the synchronous data transfer system, the aforementioned first node including the synchronous memory may be so arranged that upon reading the data received by said synchronous memory from said second node, said first node sends out onto the loop-back clock bus one or plural cycles of the clock signals derived from the clock signal for said synchronous memory. By virtue of such arrangement, the synchronous data transfer in the read operation can be realized solely by providing for the address buffer which is inherently different from the synchronous memory the decoders for the address, command and control signals.

A fourth aspect of the present invention can be seen in the synchronous data transfer system which includes a first node for storing data and a second node for controlling said first node, said second node and said first node being connected to an address buffer, a command bus, a control bus, a clock bus and a data bus, respectively, said first node including at least one address buffer and at least one synchronous memory, at least one of said address buffers incorporating a phase-locked loop circuit, wherein said address bus, said command bus, said control bus and said clock bus are connected to said synchronous memory by way of a logic circuit provided at least in said address buffer of said first node, said data bus being connected from said second node directly to said synchronous memory, and said synchronous memory including redundant code generating means for generating an error checking and correction code, wherein said synchronous memory responds to reception of read command from said address bus, said command bus and said control bus to thereby output the error checking and correction redundant code generated by said redundant code generating means after having outputted the data read out. By incorporating the redundant code generating unit in the synchronous memory for generating the error checking and correction code, reliability of the synchronous data transfer system can be enhanced.

In the synchronous data transfer system, the aforementioned redundant code generating unit may be connected to both a sense amplifier incorporated in said synchronous memory and a column switch incorporated in said synchronous memory, to thereby generate the error checking and correction redundant code on the basis of the data amplified by said sense amplifier, while said column switch outputs data of the length for transfer as set in the register of said synchronous memory by changing over the input for the data from said sense amplifier, and at a time point when the data of the length for transfer has been outputted, said column switch changes over the input for the error checking and correction redundant code outputted from said redundant code generating unit. By connecting the redundant code generating unit to both the sense amplifier incorporated in said synchronous memory and the column switch incorporated in said synchronous memory, to thereby generate the error checking and correction redundant code on the basis of the data amplified by said sense amplifier, and by changing over the input for the error checking and correction redundant code generated by the redundant code generating unit at a time point when the data of the length for transfer has been outputted, the redundant code for the error checking and correction can easily be added.

In the synchronous data transfer system, the aforementioned redundant code generating unit may be connected to a column switch incorporated in said synchronous memory and a data output unit of said synchronous memory to hold data of length for the transfer as outputted from said column switch, for thereby generating the error checking and correction redundant code from the data being held, and at a time point when the data of the length for transfer as set in the register of said synchronous memory has been outputted, said redundant code generating means outputs the error checking and correction redundant code as generated to a data output unit. By connecting the error checking and correction redundant code generating unit to the column switch incorporated in said synchronous memory and the data output unit of said synchronous memory, as described above, it is possible to obtain easily the source data for generating the error checking and correction redundant code, while in the cycle succeeding to the output of the data of burst length, the error checking and correction redundant code as generated can be outputted.

In the synchronous data transfer system, the aforementioned redundant code generating unit may be so implemented that it receives as input thereto the data outputted, for thereby generating an error checking and correction redundant code in parallel during a time period in which said data is outputted, and that the time period required for generating said error checking and correction redundant code can be covered by the time period required for said data to be outputted. Because the time period required for generating said error checking and correction redundant code by the error checking and correction redundant code generating unit is covered by the time period required for said data to be outputted, the error checking and correction redundant code as generated can be outputted in succession to the data output cycle without exerting any influence thereto.

In the synchronous data transfer system, the aforementioned redundant code generating unit may further be implemented such that the number of bits of the data outputted from the sense amplifier incorporated in said synchronous memory is same as that of bits of the data inputted to said error checking and correction redundant code generating unit, and in said error checking and correction redundant code generating unit, said error checking and correction redundant code is generated from said data inputted in the form of bit sets each including bits in a number equal to n-th power of two, starting from the least significant bit of the column address, so that said error checking and correction redundant code is outputted in the form of sets each including a number of redundant codes equal to n-th power of two or outputted selectively. By setting the number of bits of the data outputted from the sense amplifier incorporated in said synchronous memory to be same as that of bits of the data inputted to said error checking and correction redundant code generating unit, and generating the error checking and correction redundant code in the form of sets each containing a number of bits equal to n-th power of two, starting from the least significant bit of the column address for the input data in the error checking and correction redundant code generating unit, error checking and correction redundant code generating unit can be implemented in a small circuit scale.

In the synchronous data transfer system, the numerical value of n mentioned above may be derived from a relation that the n-th power of two is equal to the length of data for transfer as set in the register of said synchronous memory. By deriving the input of the error checking and correction redundant code generating unit on the basis of the relation or condition that the length of data for transfer as set in the register of said synchronous memory is equal to the n-th power of two, the relevant bit set can be determined simply by indicating the read-out address, whereby the error checking and correction redundant code generated for that bit set can easily be selected.

BRIEF DESCRIPTION OF THE DRAWINGS

FIGS. 17A and 17B are views showing outer appearance of a memory module.

DESCRIPTION OF THE PREFERRED EMBODIMENTS

Figure 1:
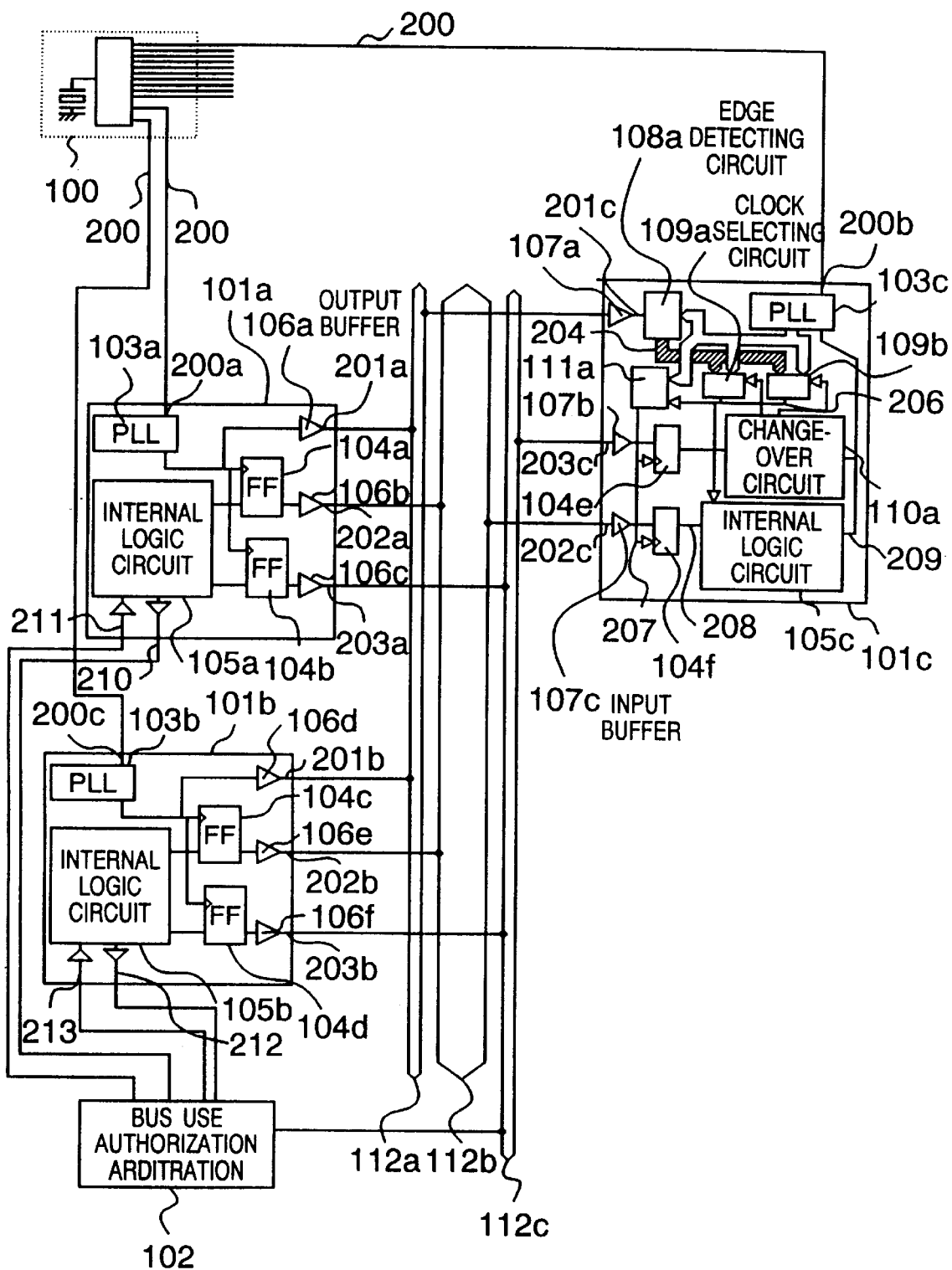
FIG. 1 is a view showing a configuration of a synchronous data transfer system according to a first embodiment of the present invention.
Figure 2:
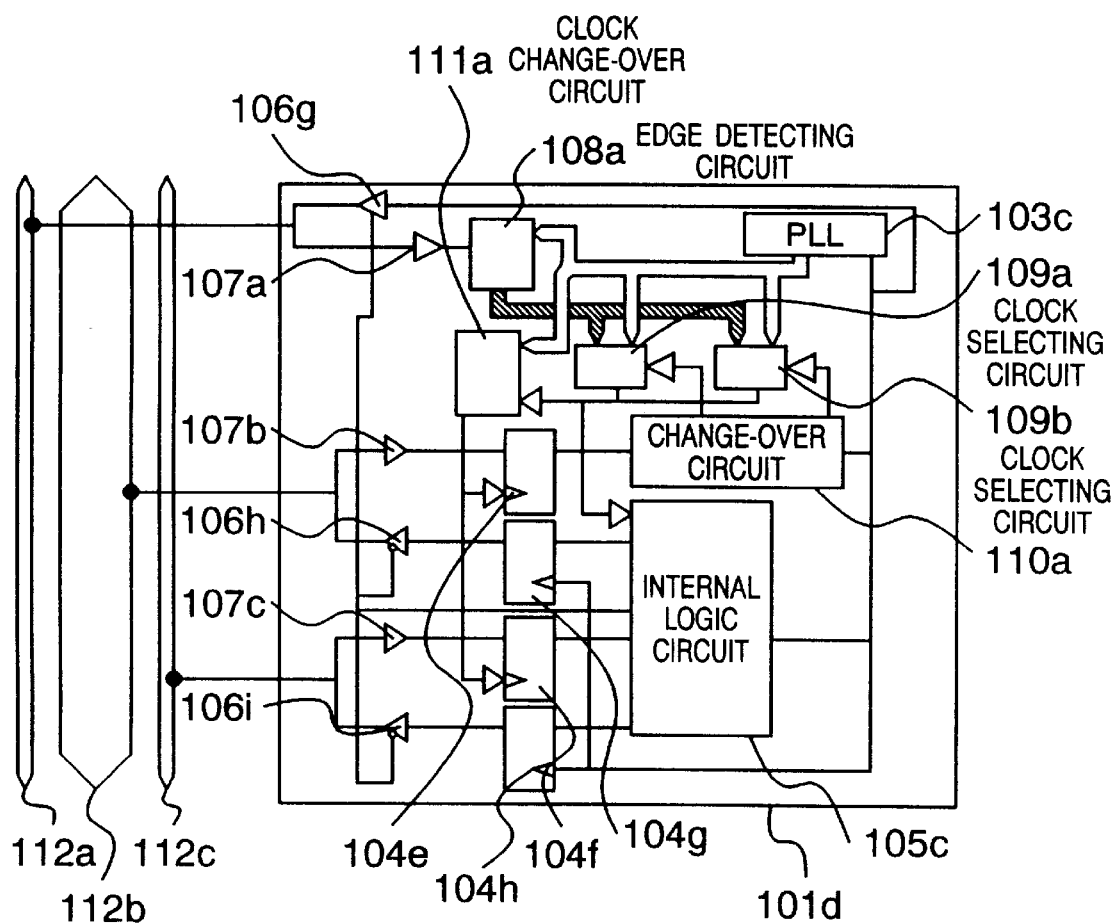
FIG. 2 is a view showing a structure of a semiconductor chip constituting a part of the synchronous data transfer system.

In the following, exemplary embodiments of the present invention will be described by reference to the drawings. FIG. 1 shows a synchronous data transfer system according to a first embodiment of the present invention. Referring to FIG. 1, semiconductor chips 101a, 101b and 101c are connected to a phase reference signal bus 112a, a data bus 112b and a transfer end signal bus 112c, respectively. The semiconductor chips 101a and 101b serve only for sending by way of the data bus 112b those data which result from the processings executed by internal logic circuits 105a and 105b, respectively, as will be described hereinafter, while the semiconductor chip 101c serves only for receiving the data from the semiconductor chips 101a and 101b by way of the data bus 112b for thereby processing the data as received by an internal logic circuit 105c incorporated in the semiconductor chip 101c. On the other hand, FIG. 2 shows another type semiconductor chip 101d which is designated not only to send the data resulting from the processing executed by an internal logic circuit 105d incorporated in the semiconductor chips 101d by way of the data bus 112b but also for receiving the data from the semiconductor chips 101a and 101b by way of the data bus 112b to thereby process the received data by the internal logic circuit 105d. In other words, the semiconductor chip 101d serves for both the functions of data sending and data reception.

The semiconductor chip 101a includes a phase-locked loop (PLL) circuit 103a which is designed to receive a reference clock signal from a source oscillator 100 to thereby output a predetermined frequency-multiplied clock signal, a predetermined frequency-divided clock signal and a polyphase clock signal, respectively, an output buffer 106a for receiving the clock signals from the phase-locked loop circuit 103a to thereby output a phase reference signal 201a on the basis of these clock signals, respectively, flip-flop (FF) circuits 104a and 104b for receiving the clock signals from the phase-locked loop circuit 103a, the internal logic circuit 105a for realizing a specific function imposed on the semiconductor chip 101a, an output buffer 106b for receiving the data resulting from the processing executed by the internal logic circuit 105a to thereby output the data by way of the flip-flop circuit 104a, and an output buffer 106c for sending out a transfer end signal 203a indicating the end of the data resulting from the processing executed by the internal logic circuit 105a. The output buffer 106a is connected to the phase reference signal bus 112a for outputting the phase reference signal 201a, while the output buffer 106b is connected to the data bus 112b for outputting the data 202a with the output buffer 106c being connected to the transfer end signal bus 112c for outputting the transfer end signal 203a. The internal logic circuit 105a receives a command signal from a bus use authorization or bus privilege arbitrating circuit 102 via an amplifier, wherein the command signal indicates authorization or privilege of use of the phase reference signal bus 112a, the data bus 112b and the transfer end signal bus 112c, which will be described in detail later on. The structure of the semiconductor chip 101b is essentially same as that of the semiconductor chip 101a described above. Accordingly, the individual constituent elements of the semiconductor chip 101b are denoted by like reference numerals as those of the semiconductor chip 101a and repeated description thereof is omitted.

The semiconductor chip 101c is comprised of a phase-locked loop circuit 103c for receiving the reference clock signal from the source oscillator 100 to thereby output the clock signals similar to those mentioned previously, respectively, an edge detecting circuit 108a for receiving the clock signals from the phase-locked loop circuit 103c to detect the edge of the phase reference signal on the basis of the clock signals, clock selecting circuits 109a and 109b for receiving the edge detection signal from the edge detecting circuits 108a to thereby select one of the clock signals mentioned previously, a clock change-over switch 111a for changing over to one of the aforementioned clock signals, a change-over circuit 110a for changing over to one of the clock selecting circuits 109a and 109b, an internal logic circuit 105c for executing a specific processing imposed on the associated semiconductor chip 101c, an input buffer 107a connected to the phase reference signal bus 112a for receiving a phase reference signal 201c to thereby supply it to the edge detecting circuit 108a, an input buffer 107c connected to the data bus 112b for receiving data 202c and supplying the data not only to a flip-flop circuit 104f but also to the change-over circuit 110a, and an input buffer 107b for receiving a transfer end signal 203c commanding the end of the data transfer to thereby supply the transfer end signal 203c to a flip-flop circuit 104e as well as to the internal logic circuit 105c.

The bus use authorization arbitrating circuit 102 receives bus use authorization or bus privilege requests from the semiconductor chips 101a, 101b and 101c, respectively, in the form of bus use authorization or bus privilege request signals 210 and 212. More specifically, the bus use authorization arbitrating circuit 102 monitors the state in which the buses are used and responds to the bus privilege request signal 210 or 212 issued by the semiconductor chip 101a, 101b and/or 101c to thereby assign the bus use privilege through the signal 211; 213 when the relevant bus gets rid of the occupied or busy state. In the case of the exemplary embodiment shown in FIG. 1, the bus use authorization arbitrating circuit 102 monitors or supervises the transfer end signal transmitted through the transfer end signal bus 112c to thereby assign the bus use privilege to one of the semiconductor chips 101a, 101b and 101c which has acquired the bus use authorization or privilege every time the transfer end signal arrives at the semiconductor chip 101c.

The semiconductor chip 101d shown in FIG. 2 is imparted with the capability or function for sending out the data resulting from the processing(s) executed by the internal logic circuit 105d and the function for processing the data received through the data bus 112b. The data sending function of the semiconductor chip 101d is implemented similarly to that of the semiconductor chip 101a or 101b, while the receiving function of the semiconductor chip 101d is realized by the same arrangement as that of the semiconductor chip 101c. Arrangement specific to the semiconductor chip 101d shown in FIG. 2 can be seen in that an output buffer 106g is provided in parallel with the input buffer 107a for the phase reference signal, wherein the output buffer 106g is so arranged as to output the phase reference signal onto the phase reference signal bus 112a. Further, an output buffer 106h is provided for outputting onto the data bus 112b the data undergone the processing by the internal logic circuit 105c. Additionally, provided in parallel with the input buffer 107c is an output buffer 106i which is designed to output the transfer end signal for the data processed by the internal logic circuit 105c onto the transfer end signal bus 112c by way of a flip-flop circuit 104h.

Figure 3:
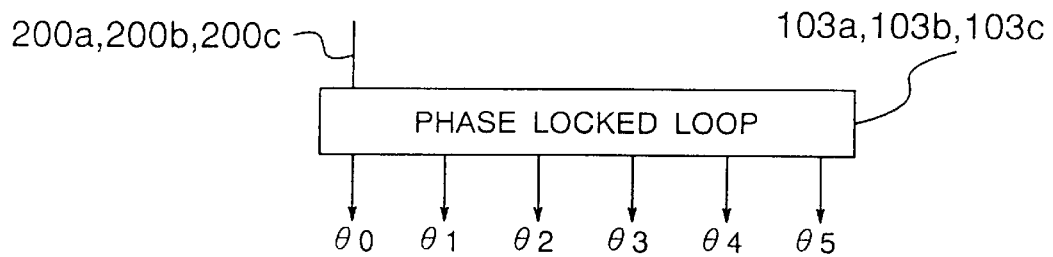
FIG. 3 is a view showing a configuration of a phase-locked loop implemented in the semiconductor chip.

Now, referring to FIG. 1, FIG. 2 and FIG. 3, operation of the semiconductor chip 101c for synchronous reception of data from the semiconductor chips 101a and 101b will be elucidated, by way of example.

Each of the semiconductor chips 101a, 101b and 101c is supplied with the system reference clock signal from the source oscillator 100 to thereby allow the frequency-multiplied clock signal, the frequency-divided clock signal and the polyphase clock signal to be generated by the phase-locked loop circuits 103a, 103b and 103c, respectively, so that these clock signals are made available in the semiconductor chips 101a, 101b and 101c. In the case of the synchronous data transfer system according to the first embodiment of the present invention, clock signals of six phases are generated with a same frequency, as is illustrated in FIG. 3.

Although the clock signals of six phases are generated with a same frequency in the synchronous data transfer system according to the first embodiment of the present invention, the number of the phases as required for the clock signal is determined on the basis of the conditions mentioned below. In the case of the synchronous data transfer system according to the first embodiment of the invention now under consideration, for the data-effective time to be secured by the flip-flop circuits 104e and 104f at the receiver side, an integer value greater than one period of the operation clock signal of the semiconductor chip 101c is arithmetically determined by multiplying the data-effective time by an integer, wherein an integer value equal to or greater than the arithmetically determined value mentioned above is selected as the number of the phases of the clock signal.

Under the conditions mentioned above, so long as the data as transferred can guarantee or secure sufficiently the data-effective time to be secured by the flip-flop circuits 104e and 104f, there exists internally of the semiconductor chip 101c the clock-signal which can be latched without fail. In the case of the synchronous data transfer system according to the first embodiment of the invention, each of the internal logic circuits 105a, 105b and 105c incorporated in the semiconductor chips 101a, 101b and 101c, respectively, operates basically with the zeroth phase φ0. However, the internal logic circuit 105a; 105b; 105c may equally be so implemented as to operate with polyphase such as two phases φ0 and φ3 or with three phases φ0, φ2 and φ4 or the like, when occasion requires, although illustration is omitted.

Fed to the phase reference signal bus 112a is the phase reference signal 201a from the data transfer source, e.g. the semiconductor chip 101a. In the semiconductor chip 101c, the phase reference signal 201c is sampled by the edge detecting circuit 108a with the polyphase clocks φ0 to φ5 mentioned previously. From the result of the sampling, it is detected between which phases φ0, . . . , φ5 of the polyphase clocks the edge is located, whereupon the result of the detection is outputted to clock selecting circuits 109a and 109b as a phase information signal 204.

Either one of the clock selecting circuit 109a or 109b is selected by the change-over circuit 110a, whereupon either the clock selecting circuit 109a or 109b as selected determines selectively from the polyphase clocks φ0 to φ5 on the basis of the phase information signal 204 mentioned above the phase of the clock signal which is to serve for determining the timing for the latch operation of the flip-flop circuits 104e and 104f. The clock signal as selected is then supplied to the clock change-over switch 111a as a clock selection information signal 206.

In the synchronous data transfer system according to the first embodiment of the invention, the clock change-over switch 111a is disposed in the vicinity of the flip-flop circuits 104e and 104f. The clock change-over switch 111a selects the phase of the clock signal for the latch timing of the flip-flop circuits 104e and 104f from the polyphase clocks φ0 to φ5 on the basis of the information contained in the clock selection information signal 206 mentioned above, whereon the clock signal as selected is outputted to the flip-flop circuits 104e and 104f.

Owing to the synchronization processing described above, the flip-flop circuits 104e and 104f can latch the data transferred via the data bus 112b and the transfer end signal bus 112c, respectively, with the clock signal supplied from the clock change-over switch 111a.

Figure 4:
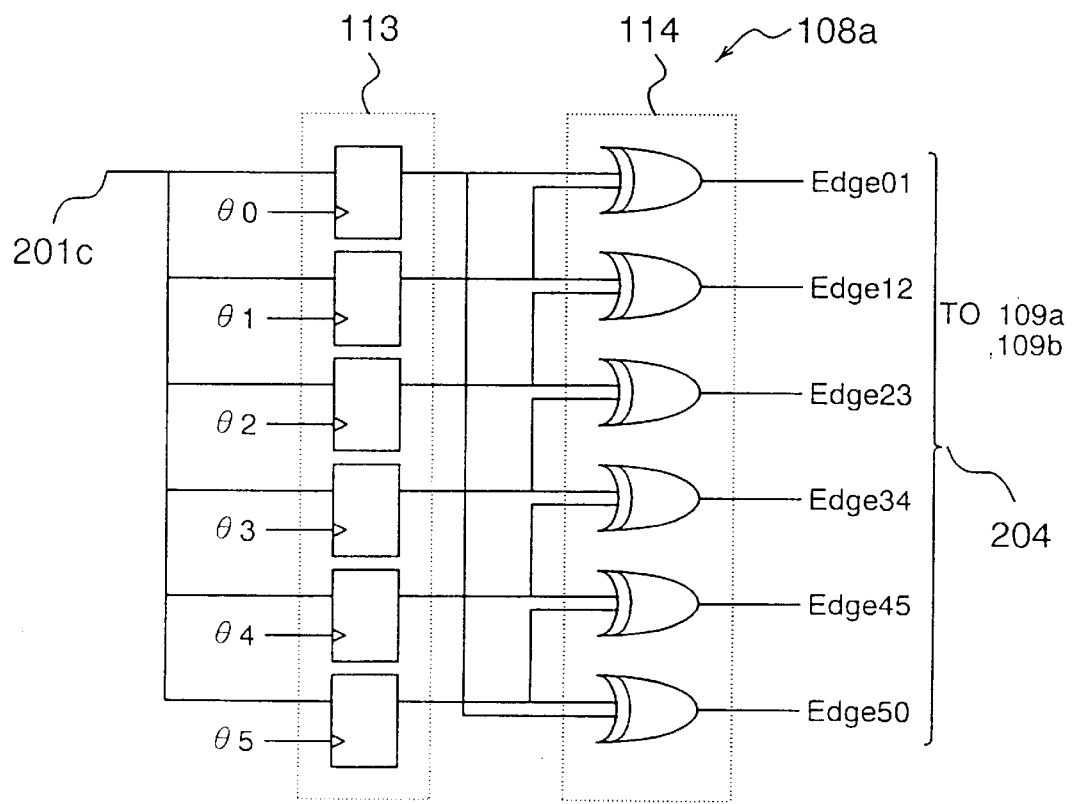
FIG. 4 is a view showing a circuit arrangement of an edge detecting circuit implemented in the semiconductor chip.

FIG. 4 shows a circuit structure of the edge detecting circuit 108a, by way of example. The edge detecting circuit 108a is composed of a sampling circuit 113 and an edge detecting circuit 114. The phase reference signal 201c is inputted to the sampling circuit 113 to be latched with the polyphase clocks φ0 to φ5.

The edge of the phase reference signal 201c makes appearance at the output of the sampling circuit 113 in the form of a six-bit series with "n bits of "L" and (6-n) bits of "H"" or alternatively with "n bits of "H" and (6-n) bits of "L"". The six bits outputted from the sampling circuit 113 are applied to the inputs of the edge detecting circuit 114.

The edge detecting circuit 114 is designed to detect among the adjacent bits a set of the bits which change from "L" to "H" or from "H" to "L". On the basis of the bit set as detected, the edge detecting circuit 114 specifically determines between which phases of the polyphase clocks φ0 to φ5 the edge of the phase reference signal 201c is positioned, whereon the edge detecting circuit 114 outputs the phase information signal 204 as the phase information Edge 01, Edge 12, Edge 23, Edge 34, Edge 45 or Edge 50 as determined.

Figure 5:
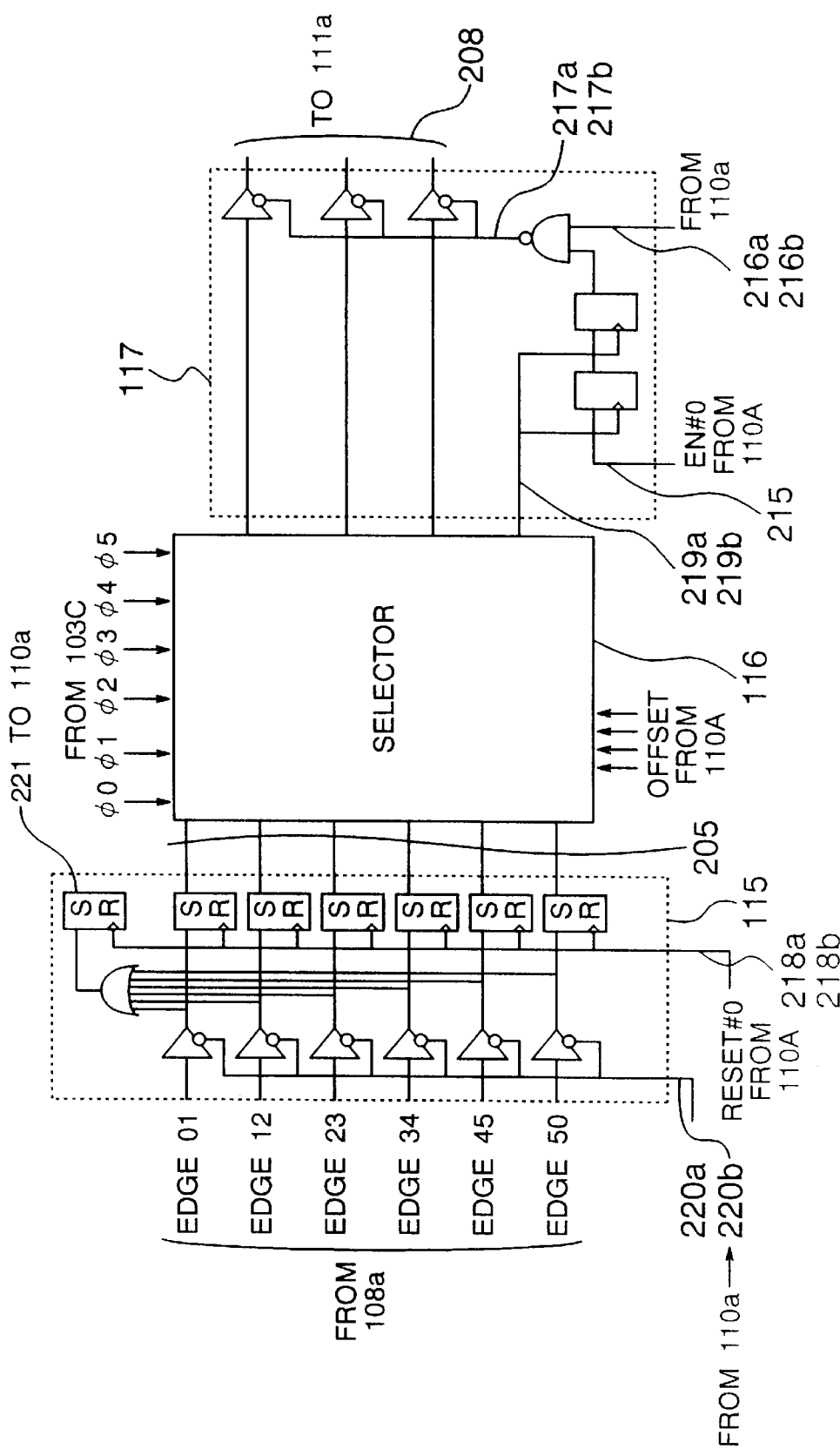
FIG. 5 is a view showing a structure of a clock selecting circuit implemented in the semiconductor chip.

FIG. 5 shows, by way of example, a circuit configuration of the clock selecting circuit 109a; 109b. The clock selecting circuit 109a; 109b is comprised of a phase information hold circuit 115, a selector 116 and a waveform shaper 117. The phase information signal 204 inputted from the edge detecting circuit 108a is held until the phase information hold circuit 115 is reset by a hold state clear signal 218 (218a; 218b) supplied from the edge detecting circuit 108a. Further, the hold/non-hold status of the phase information signal 204 inputted to the phase information hold circuit 115 is messaged to the change-over circuit 110a as the hold state message signal 221a; 221b from the edge detecting circuit 108a.

Information as to whether the phase information hold circuit 115 holds or not the phase information signal 204 depends on whether or not the change-over circuit 110a is controlled by a selecting circuit change-over signal 220a or 220b. The phase information signal 205 as held is inputted to the selector 116, which in turn outputs the clock selection information signal 206 by referencing an offset input signal (Offset) from the change-over circuit 110a.

The clock selection information signal 206 is used for controlling the output of the waveform shaper 117 by latching a transfer end signal 215 from the change-over circuit 110a with the clock signal supplied from the selector 116 and by logically ORing with the selection signal 216 supplied from the change-over circuit 110a. Owing to this control, the clock selecting circuit 109a; 109b can output the shaped clock selection information signal 206 to the clock change-over switch 111a. In this manner, synchronized transfer of the clock selection information signal 206 can be realized between the clock selecting circuit 109a; 109b and the clock change-over switch 111a.

Figure 6:
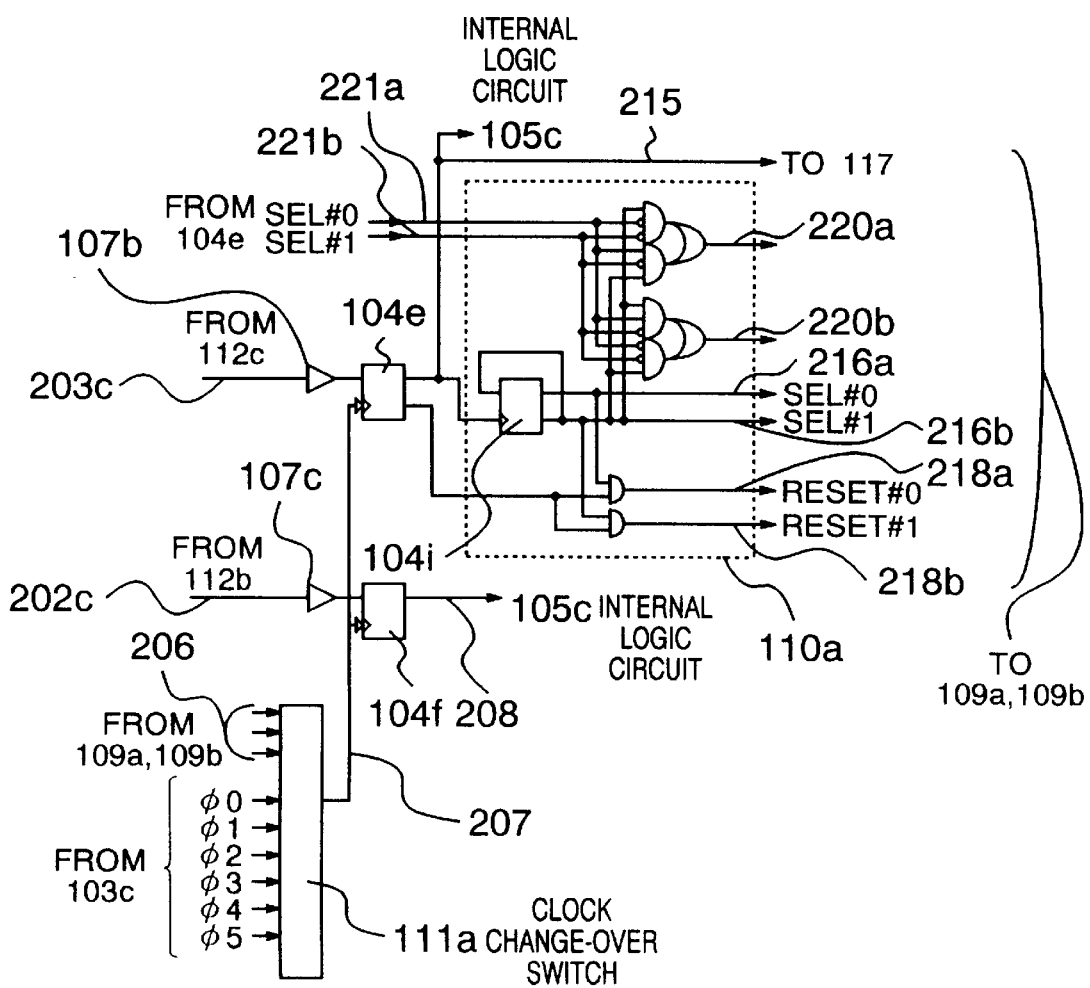
FIG. 6 is a view showing a structure of a change-over circuit for a clock change-over switch and a clock selecting circuit implemented in the semiconductor chip.

FIG. 6 shows interconnection of the clock change-over switch 111a, the input circuits for the data bus 112b and the transfer end signal bus 112c, and the change-over circuit 110a. The clock change-over switch 111a selects one phase from the polyphase clocks φ0 to φ5 on the basis of the clock selection information signal 206 supplied from the clock selecting circuit 109a; 109b to thereby activate the flip-flop circuits 104e and 104f for latching the data transferred via the data bus 112b and the transfer end signal bus 112c, respectively.

The change-over circuit 110a responds to inputting of the transfer end signal 215 from the transfer end signal bus 112c latched by the flip-flop circuit 104e as the clock signal for a flip-flop circuit 104i to thereby generate two enable signals 216a (SEL#0) and 216b (SEL#1). These enable signals 216a and 216b are alternatively accepted by the flip-flop circuit 104i. Further, the enable signals 216a and 216b are made use of for controlling the outputting of the reset signals 218a (Reset #0) and 218b (Reset #1) generated from the transfer end signal 215 of the transfer end signal bus 112c.

In this manner, two couples or pairs of the enable signals 216a and 216b and the reset signals 218a and 218b are inputted to the clock selecting circuits 109a and 109b for controlling the resetting of the phase information hold circuit 115 and the output of the waveform shaper 117 incorporated in the clock selecting circuit 109a; 109b so that the clock selecting circuits 109a and 109b designed for outputting the clock selection information signal 206 to the clock change-over switch 111a can alternately be changed over to each other.

The selecting circuit change-over signals 220a and 220b to be outputted are changed over to each other in dependence on the enable signal 216a and the hold state message signal 221a (SET #0); 221b (SET #1) furnished from the clock selecting circuit 109a; 109b. By virtue of this change-over arrangement, it is possible to incorporate only one clock selecting circuit 109a; 109b in the semiconductor chip 101c for holding the phase information.

Figure 7:
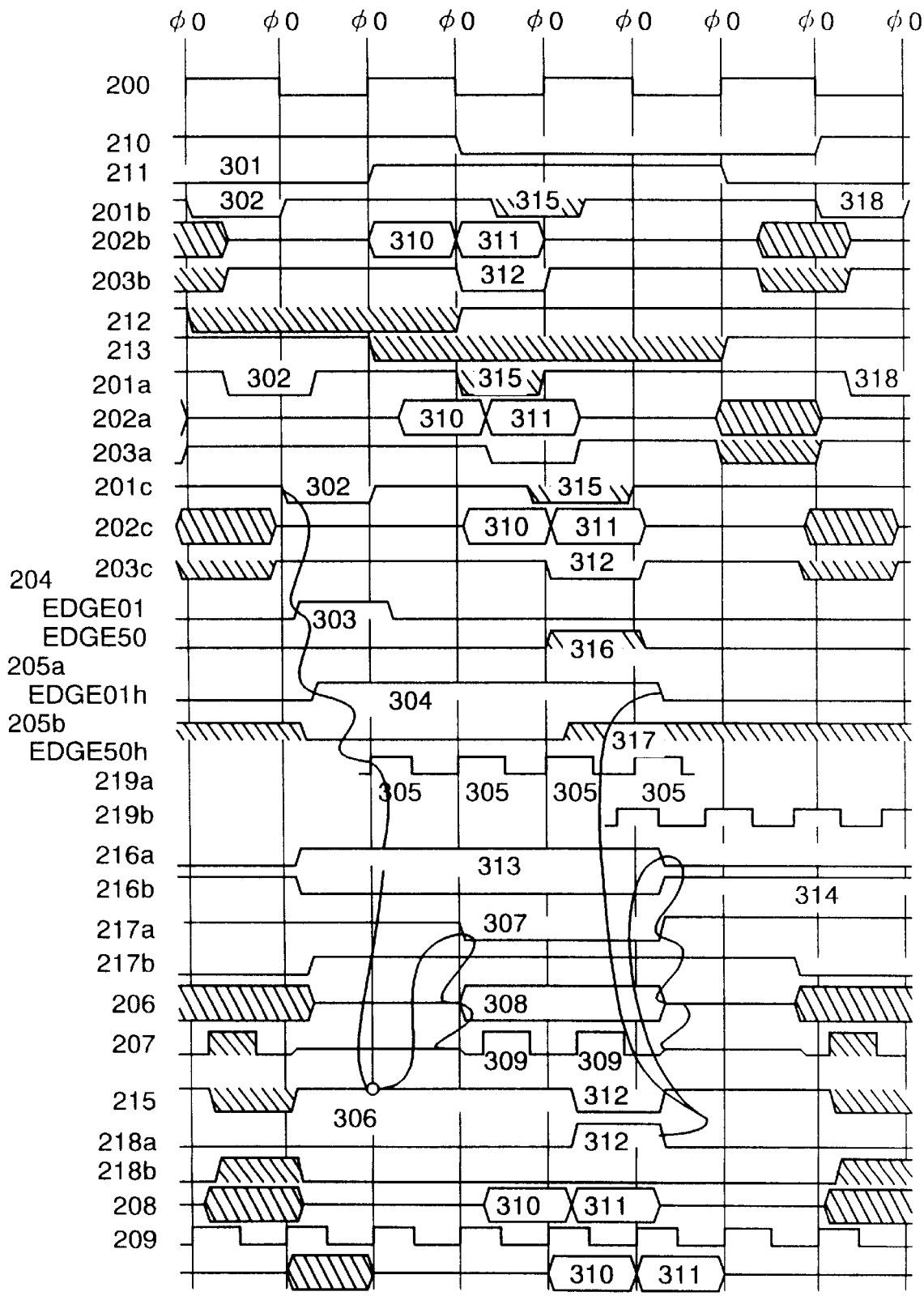
FIG. 7 is a view for illustrating operation of the synchronous data transfer system.

FIG. 7 is a time chart for illustrating a series of operations of the synchronous data transfer system according to the first embodiment of the present invention. Referring to the figure, the reference clock 200 is supplied from the source oscillator 100 to the semiconductor chips 101a, 101b and 101c, respectively, wherein the phase of the reference clock 200 is referenced in each of the semiconductor chips 101a, 101b and 101c for aligning or matching the phase of the clock signals in the semiconductor chips 101a, 101b and 101c.

In each of the semiconductor chips, the internal phase-locked loop circuit 103a; 103b; 103c serves not only for the phase adjustment but also for generation of the polyphase clock signals by multiplying the frequency of the clock signal mentioned above by six and again dividing the clock signal of the six-multiplied frequency by six (to thereby make the clock signal into polyphase clock signal). The phase-locked loop circuit 103a; 103b; 103c outputs the clock signals of six phases in total, inclusive of the clock signal φ0 which is in phase with the reference clock 200 inputted and the clock signals φ1 to φ5 having respective phases shifted by ⅙ of one period of the reference clock 200.

The semiconductor chip 101a; 101b; 101c operates at the clock φ0 which serves also as the reference clock for the phase reference signal bus 112a, the data bus 112b and the transfer end signal bus 112c, respectively.

In FIG. 7, reference numerals 212 and 213 designate the bus use authorization request signal and the bus use privilege signal of the semiconductor chip 101b, respectively, while reference characters 201b, 202b and 203b designate the input/output waveforms for the buses 112a, 112b and 112c of the semiconductor chip 101b, respectively.

Furthermore, reference numerals 210 and 211 designate the bus use authorization request signal and the bus use privilege signal of the semiconductor chip 101a, respectively, while reference characters 201a, 202a and 203a designate the input/output waveforms for the phase reference signal bus 112a, the data bus 112b and the transfer end signal bus 112c of the semiconductor chip 101a, respectively. Additionally, reference characters 201c, 202c and 203c designate, respectively, the input waveforms for the semiconductor chip 101c. Besides, reference characters 204, 205a, 205b, 206 to 209 designate the signals generated internally of the semiconductor chip 101c. Reference characters 216a, 216b, 217a, 217b, 218a, 218b, 219a and 219b designate the selection signals which are generated internally of the semiconductor chip 101c.

In the following, data transfer among the semiconductor chips 101a, 101b and 101c will be described. At this juncture, it should be mentioned that the following description is directed only to the data transfer from the semiconductor chip 101b to the semiconductor chip 101c and the synchronization operation. A series of operations described below are basic data transfer and synchronizing operations according to the instant embodiment of the present invention with the other data transfer and synchronizing operation being omitted from the description for the sake of facilitation of the description.

The semiconductor chip 101b responds to the reception of the inputting of the bus use privilege signal 301 (213) to thereby output the phase reference signal 302 (201b) to the phase reference signal bus 112a. In the synchronous data transfer system according to the first embodiment of the invention, the operation clock used for the semiconductor chips 101a, 101b and 101c is the clock signal φ0 which serves also as the reference clock for the phase reference signal bus 112a, the data bus 112b and the transfer end signal bus 112c. Accordingly, the minimum repetition cycle of the phase reference signal 201b, the data 202b on the data bus 112b and the transfer end signal 203b is given by one cycle of the clock signal φ0.

In the synchronous data transfer system according to the first embodiment of the invention now under consideration, such rule is established that upon lapse of two or more cycles after the semiconductor chip (101a; 101b) acquired the bus use privilege (211; 213) has outputted the phase reference signal (201a; 202b) or upon lapse of two or more cycles after the transfer end signal (203a; 203b) outputted from the semiconductor chip (101a; 101b) in succession to the arrival of the data transfer, the semiconductor chip (101a; 101b) having the bus use privilege is allowed to output the data to be transferred onto the data bus 112b.

Thus, in the system shown in FIG. 1, the transfer data 310; 311 (202b) is outputted onto the data bus 112b upon lapse of two cycles after the arrival of the transfer end signal 203a outputted from the semiconductor chip 101a in succession to the data transfer. The transfer end signal 203b is outputted in timing with the last cycle of the transfer data on the data bus 112b. Consequently, the transfer end signal 312 (203b) is outputted in the same cycle as the transfer data 311 (202b) on the data bus 112b, as can be seen in the figure.

The phase reference signal 302 (201b), the transfer data 310; 311 (202b) on the data bus 112b and the transfer end signal 312 (203b) outputted from the semiconductor chip 101b pass through the semiconductor chip 101a to arrive at the semiconductor chip 101c. Upon arrival, these signals make appearance as the phase reference signal 201c, the data signal 202c and the transfer end signal 203c, respectively.

Phase information 303 is obtained by detecting the edge by means of the edge detecting circuit 108a incorporated in the semiconductor chip 101c. The phase information 303 is held by one of the clock selecting circuits 109a and 109b which has been selected by the change-over circuit 110a. In the case of the example illustrated in FIG. 7, the clock selecting circuit 109a has been selected. Thus, the phase information 304 is held as the phase information signal 205a in the clock selecting circuit 109a.

The selector 116 of the clock selecting circuit 109a derives from the phase information 304 a waveform shaping clock signal 305 corresponding to the clock signal $\phi 0$ which is supplied to the waveform shaper 117 as a waveform shaping clock signal 219a. The waveform shaper 117 responds to this clock signal 305 to thereby latch the transfer end signal 215 latched by the flip-flop circuit 104e, whereby the output control information 307 is generated as the output control signal 217a of the waveform shaper 117 with the output buffer of the waveform shaper 117 being set to the output state or mode.

The selector 116 delivers the clock selection information to the waveform shaper 117, and thus the waveform shaper 117 outputs the clock selection information 308 as the clock selection information signal 206 in dependence on the output state of the output control information 307 of the preceding output control signal 217a.

The clock change-over switch 111a obtains the clock selection information 308 in terms of the clock selection information signal 206 to thereby output a latch clock signal 309 corresponding to the clock signal $\phi 2$ as a latch clock signal 207 in accordance with the clock selection information 308. The flip-flop circuits 104e and 104f can latch the transfer data 202b and the transfer end signal 203b sent from the semiconductor chip 101b via the data bus 112b and the transfer end signal bus 112c, respectively, only when the latch clock 309 is supplied to the flip-flop circuits 104e and 104f.

The data 202b as latched makes appearance as the transfer end signal 312 in the form of the transfer end signal 215 of the flip-flop circuit 104e and as the transfer data 310; 311 in the form of the output signal of the flip-flop circuit 104f. Both the transfer end signal 312 and the transfer data 310; 311 are again latched internally by the internal logic circuit 105c with the bus clock signal $\phi 0$. In other words, the transfer end signal 312 and the transfer data 310; 311 are synchronized with the operation clock signal $\phi 0$ at which the semiconductor chips 101a, 101b and 101c operate, respectively, whereby synchronous transfers via the phase reference signal bus 112a, the data bus 112b and the transfer end signal bus 112c connected to the semiconductor chips 101a, 101b and 101c are completed.

The transfer end signal 215 as latched is masked by the selection signal 216a which is to serve as a hold state clear signal 218a. To say in another way, the transfer end signal 312 (203b) contained in the transfer end signal 215 provides the transfer end signal 312 (203b) for the hold state clear signal 218a. The transfer end signal 312 (203b) is made use of for setting the reset timing for the phase information hold circuit 115 of the clock selecting circuit 109a; 109b.

In the case of the example illustrated in FIG. 7, the clock selecting circuit 109a is selected with the selection signal 216a being in the selected state, whereby the synchronous transfer is realized for a series of data transfers. At the end of the data transfer, the transfer end signal 312 (203b) is outputted as the hold state clearing signal 218a. Thus, the clock selecting circuit 109a is reset.

Simultaneously, the selection signal 216a is changed over to the non-selected state, while the output command indicated by the output control information 307 of the output control signal 217a ends with the output of the clock selection information 308 generated as the clock selection information signal 206 by the clock selecting circuit 109a coming to an end. At the same time, the clock change-over switch 111a stops outputting of the clock with the clock signal 309 resuming the output stopping state.

Figure 8:
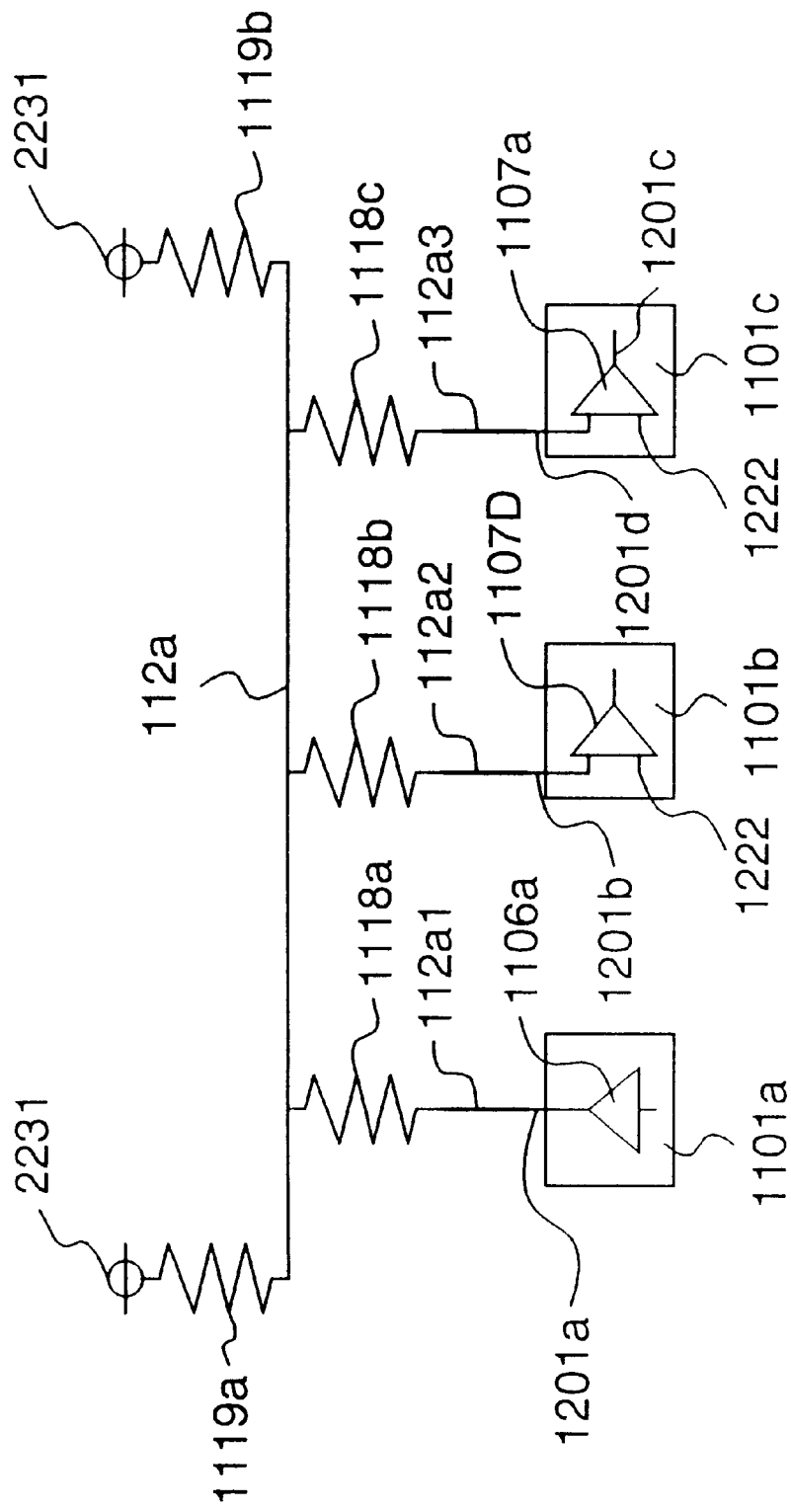
FIG. 8 is a view showing a configuration of a phase securing circuit.
Figure 9:
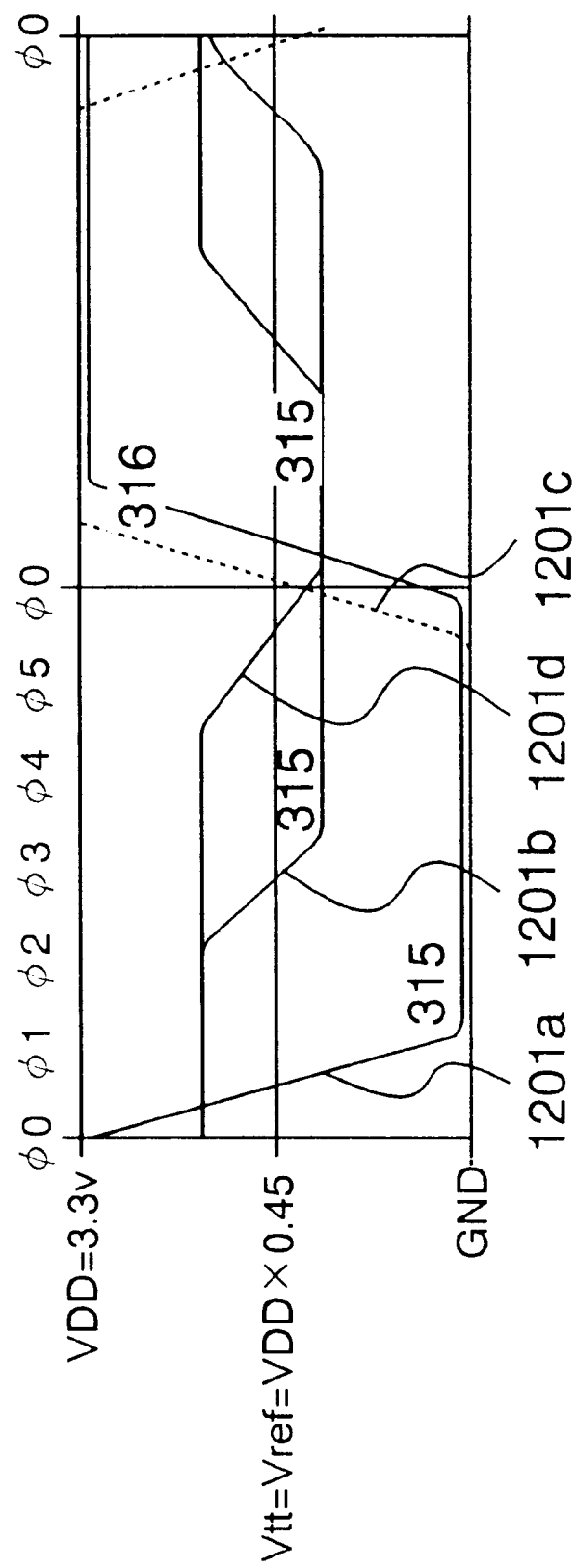
FIG. 9 is a view for illustrating propagation of signals in the phase securing circuit.

Next, referring to FIGS. 8 and 9, description will be directed to the phase securing circuit provided in association with each of the phase reference signal bus 112a, the data bus 112b and the transfer end signal bus 112c in the synchronous data transfer system according to the first embodiment of the invention. Parenthetically, in these figures, emphasis is put only on the phase reference signal bus 112a of the individual buses 112a, 112b and 112c for the simplification of illustration as well as for the convenience of description. Referring to the figures, the semiconductor chips denoted by reference characters 1101a, 1101b and 1101c are connected to the phase reference signal bus 112a by way of respective buses 112a1, 112a2 and 112a3 and matching resistors 1118a, 1118b and 1118c, respectively. In this conjunction, it should be mentioned here that the phase securing circuit shown in FIG. 8 may be implemented by resorting to the techniques disclosed in U.S. patent Ser. No. 08/388,990 which was filed as a CIP application of U.S. patent Ser. No. 08/269,352. Further, technique disclosed in U.S. patent Ser. No. 08/411,461 may be referred to for realizing the phase securing circuit.

The resistance value of the matching resistor 1118a is determined on the basis of difference between the characteristic impedance of the bus 112a1 and that of the bus (stub) 112a as viewed from the side of the bus 112a1 at a node where the bus 112a1 is connected to the bus 112a. Assuming now that the characteristic impedance of the bus 112a1 which corresponds to a stub of the bus 112a is 100 Ω and that the characteristic impedance of the bus 112a is 50 Ω, then the characteristic impedance of the bus 112a as viewed from the bus 112a1 at the connection node mentioned above is 25 Ω. Accordingly, the matching resistance value of the matching resistor 1118a is 75 Ω.

Further, the resistance value of the terminating resistor is 50 Ω in conformance with the characteristic impedance of the bus 112a. The output buffer 1101a connected to the bus 112a is constituted by conventional LV-TTL or CMOS-type output buffer, while each of input buffers 1107a and 1107d may be constituted by a differential comparator and hence so connected as to be inputted with the reference potential signal 1222.

Thus, it is safe to say that the phase securing circuit is constituted by the matching resistors 1118a, 1118b and 1118c, the terminating resistors 1119a and 1119b, the buses 112a1, 112a2 and 112a3 and the bus 112a, wherein resistance values of the matching resistors and those of the terminating resistors are derived from the relations described above. In the figure, the total number of the stubs as shown is three in conformance with the number of the semiconductor chips. However, it should be appreciated that the invention is not restricted to such specific arrangement.

Because the conventional LV-TTL or CMOS output buffer is employed, the potential level at the termination is set to be 9/20 of the source voltage which is slightly lower than a middle value of the signal amplitude. By virtue of this arrangement, the ratio between the rise time and the fall time of the output waveform can be approximated to a one-to-one (1:1) ratio although the driving capacity of NMOS (n-channel metal oxide semiconductor) of the CMOS (complementary metal oxide semiconductor) is higher than that of the PMOS (p-channel metal oxide semiconductor).

FIG. 9 shows a propagating signal waveform. More specifically, FIG. 9 is a waveform diagram for illustrating phase relation between a phase reference signal 315 on the bus 112a shown in FIG. 7 and phase information 316 derived from the phase reference signal 315. Because the conventional LV-TTL or CMOS output buffer can be employed, as described hereinbefore, the output 1201a of the semiconductor chip 1101a has an amplitude comparable to or exceeding the source voltage VDD of 3.3 volts.

Upon transfer from the matching resistor 1118a to the bus 112a, the amplitude of the output 1201a is compressed approximately to ¼ in dependence on the ratio between the sum of the source resistance inherent to the output buffer and the matching resistor 1118a and the combined resistance of the terminating resistors 1119a and 1119b. The phase reference signal 315 having the amplitude compressed travels or propagates through the bus 112a to reach the stub bus 112a2 and hence travels through the bus 112a to reach the stub bus 112a3 with the waveform designated by 1201b in FIG. 9, and finally the semiconductor chip 1101b; 1101c with the waveform designated by 1201d in FIG. 9.

In the semiconductor chip 1101c, the signal restoration is effectuated by an input buffer 1107a of the differential comparator, as a result of which the restored signal can reach the logic circuit such as the edge detecting circuit and others incorporated in the semiconductor chip with the source voltage VDD of 3.3 volts of the input buffer 107a. As can be seen from FIG. 9, the waveform travelling or propagating through the phase securing circuit shown in FIG. 8 electrically charges the stubs of the bus 112a sequentially. Thus, the waveform arrives at the semiconductor chip in accordance with the stub array.

Furthermore, because the matching resistance at the branch point of each stub on the bus 112a is effective at the stub side, reflection of the travelling or propagating wave at the branching point can be suppressed. Thus, the waveform of the signal arriving at the stub is protected against stepwise deformation. Owing to these characteristics, the phase of the waveform of the signal outputted from one and the same semiconductor chip to the other semiconductor chip can be secured or guaranteed.

Figure 10:
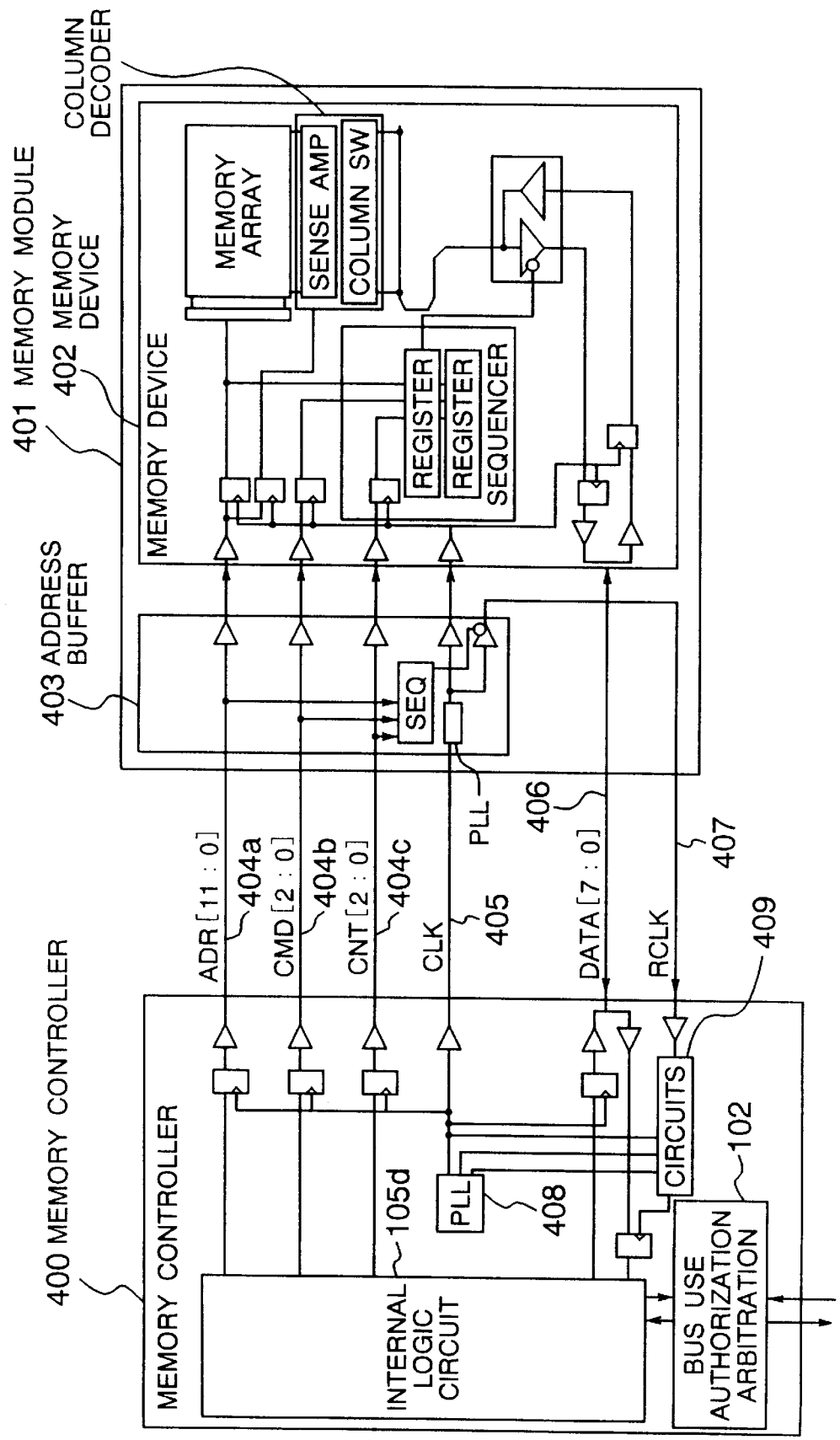
FIG. 10 is a view showing a configuration of a synchronous data transfer system according to a second embodiment of the present invention.
Figure 11:
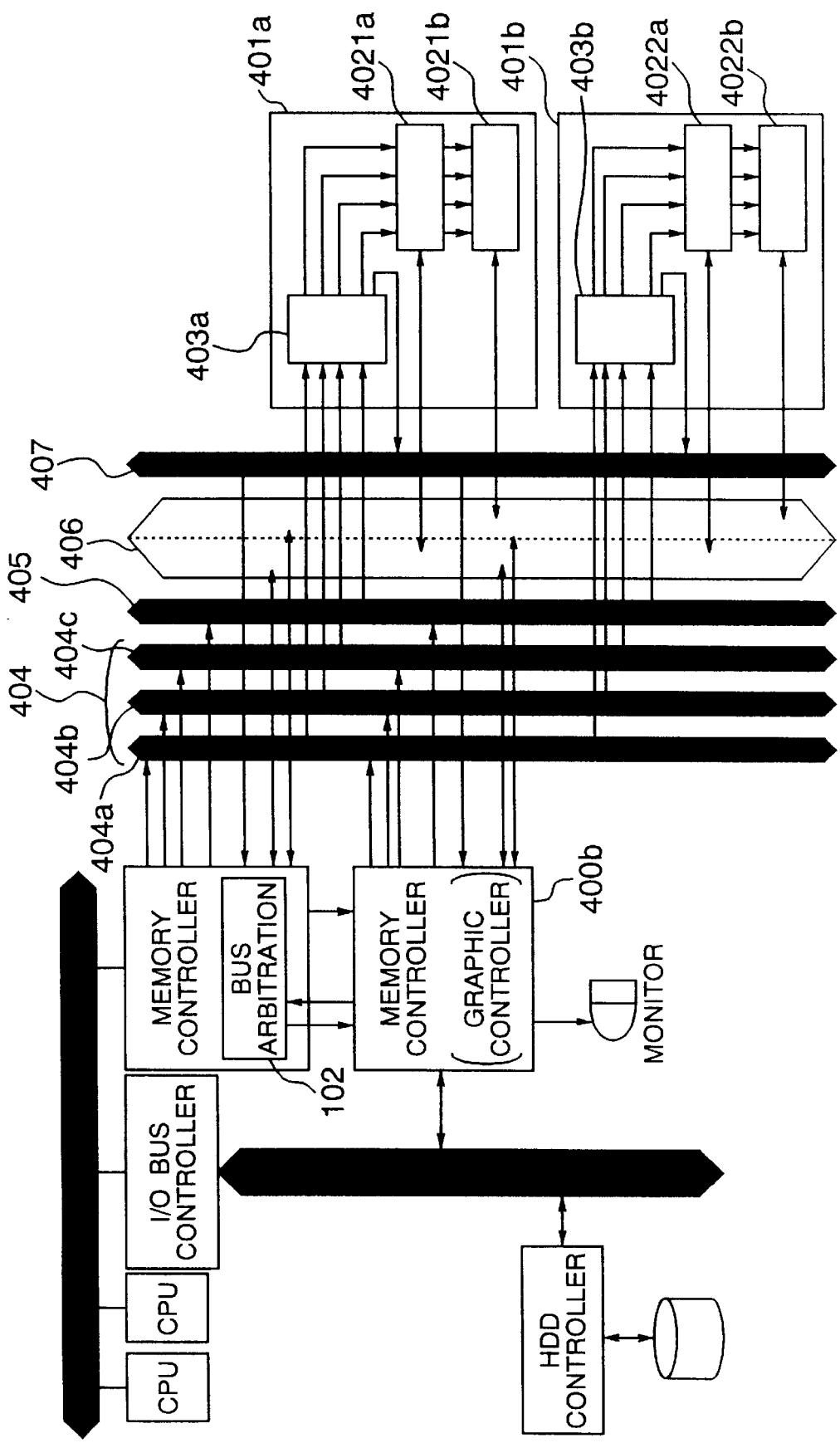
FIG. 11 is a view showing a bus configuration of a synchronous data transfer system according to a second embodiment of the present invention.

Next, a synchronous data transfer system according to a second embodiment of the present invention will be described by reference to FIGS. 10 to 13. Referring to FIG. 10, the synchronous data transfer system is comprised of a second semiconductor chip 400 having transmission/reception function and a first semiconductor chip 401 incorporating a memory device 402 and an address buffer 403 and having transmission/reception function. Although only one first semiconductor chip 401 is provided in the synchronous data transfer system shown in FIG. 10, the synchronous data transfer system may be so configured as to incorporate a plurality of first semiconductor chips 401, as shown in FIG. 11. Similarly, although only one memory device 402 on the first semiconductor chip 401 is provided in the synchronous data transfer system shown in FIG. 10, the synchronous data transfer system may be so implemented as to incorporate a plurality of memory devices 402, as shown in FIG. 11.

The address buffer 403 on the first semiconductor chip 401 serves for amplifying the data signal on the address bus 404a, the command bus 404b, the control bus 404c and the clock bus 405 to thereby distribute these data to the memory device 402 mounted or incorporated in the first semiconductor chip 401. Further, the data on the address bus 404a, the command bus 404b and the control bus 404c are decoded by the address buffer 403. Besides, when the operation for reading the memory device 402 mounted on the first semiconductor chip 401 on which the address buffer 403 itself is mounted is detected, the clock of one cycle is derived from the clock signal CLK of the clock bus 405 to be outputted onto the loop-back clock bus 407.

The memory device 402 may be implemented as a synchronous memory, i.e., a so-called synchronous DRAM (dynamic random access memory) or a SGRAM (synchronous graphic random access memory). Although in the synchronous data transfer system shown in FIG. 10, it is assumed that the memory device 402 is constituted by a synchronous DRAM, it should be appreciated that similar functions and operations can be achieved even when the memory device 402 is employed as the synchronous SRAM. Thus, in the system shown in FIG. 10, an address signal ADR for the synchronous DRAM, a command signal CMD composed of an chip select signal, a write enable signal, a RAS (row address strobe) signal, and a CAS (column address strobe) signal and a control signal CNT composed of a clock enable signal and a mask signal are transferred from the second semiconductor chip 400 to the memory device 402 via the address bus 404a, the command bus 404b and the control bus 404c, respectively.

Further transferred from the second semiconductor chip 400 to the memory device 402 via the clock bus 405 is the clock signal CLK which serves as a clock of the synchronous DRAM and is a signal line.

Additionally, transferred from the second semiconductor chip 400 to the memory device 402 via the data bus 406 is write data DATA, while being transferred as being looped back from the memory device 402 to the second semiconductor chip 400 via the data bus 406 is the read-out data DATA. Referring to FIG. 11, the data bus 406 is constituted by a group of signal lines to which the memory devices 4021a and 4021b are connected and a group of signal lines to which memory devices 4022a and 4022b are connected, wherein these groups of signal lines are constituted by a signal line of one or more bits, respectively.

Transferred to the loop-back clock bus 407 is a loop-back clock signal RCLK from the address buffer 403 incorporated in the first semiconductor chip 401 to which a read request is sent from the second semiconductor chip 400.

In the synchronous data transfer system according to the second embodiment of the present invention, the second semiconductor chip 400 utilizes as the phase reference signal the loop-back clock signal RCLK sent from the address buffer 403 of the first semiconductor chip 401 and received via the loop-back clock bus 407. A control circuit 409 composed of an edge detection circuit, a clock select circuit, a change-over circuit for the clock select circuit and a clock change-over switch as incorporated in the second semiconductor chip 400 selects a clock signal from the phase reference signal mentioned above for latching the data from the data bus 406 which data are to undergo the synchronous transfer.

In the synchronous data transfer system shown in FIG. 11, a plurality of second semiconductor chips 400 are provided, wherein one of the second semiconductor chips as designated by second semiconductor chip 400a monitors the other second semiconductor chip 400b so that the bus use privilege for the buses 404a, 404b, 404c, 405, 406 and 407 can be transferred without need for signal transfer between the second semiconductor chips 400a and 400b. To this end, a bus use authorization arbitrating circuit 102 is incorporated in the second semiconductor chip 400a for the arbitration of the bus use privilege with the second semiconductor chip 400b.

Figure 12:
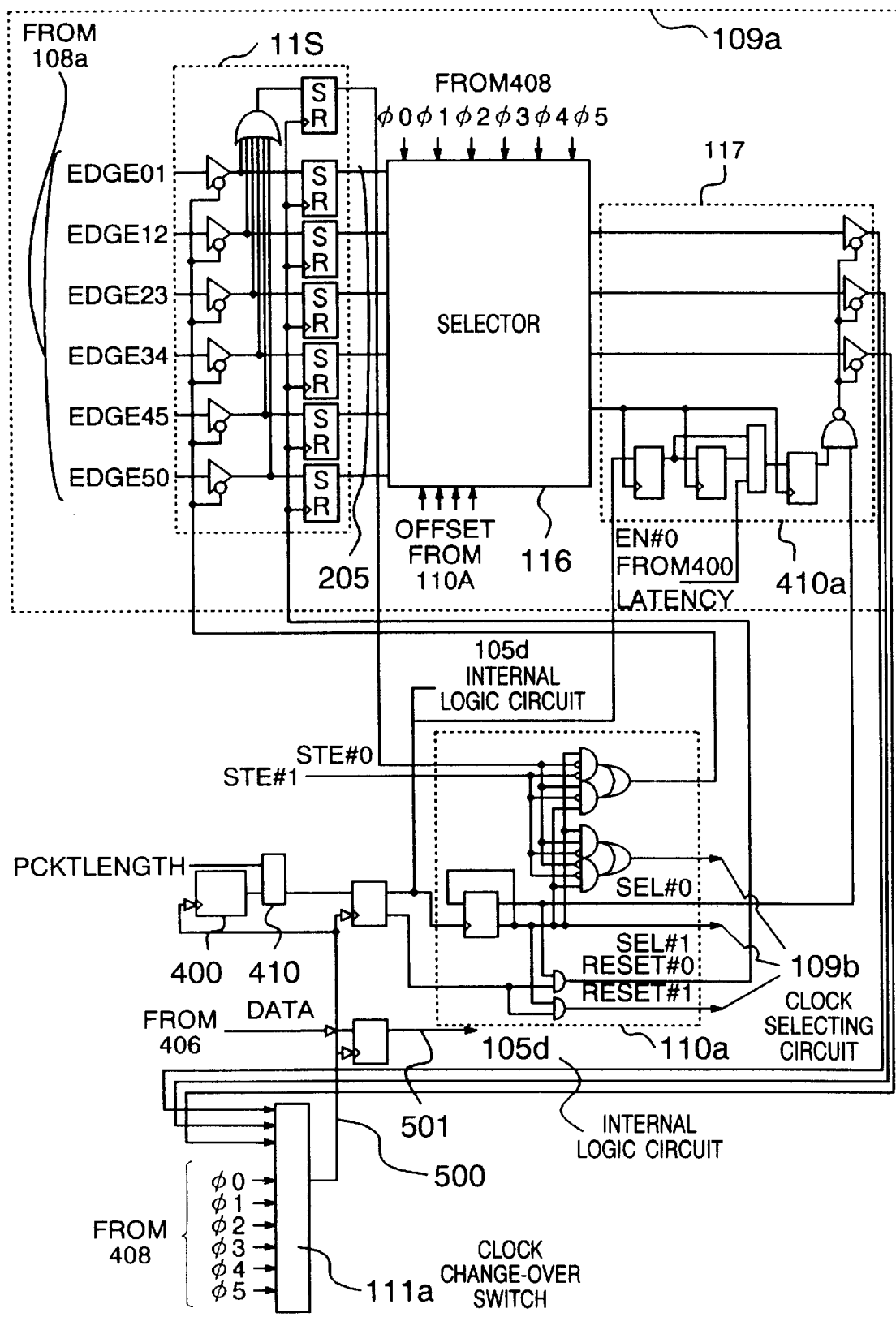
FIG. 12 is a diagram showing a structure of a clock selecting circuit and a change-over circuit for a clock change-over switch and the clock selecting circuit implemented in the semiconductor chip.

FIG. 12 is a circuit diagram showing structures of the clock selecting circuits 109a and 109b, the clock change-over switch 111a and the change-over circuit 110a for the clock selecting circuits 109a and 109b. The control circuit 409 which is incorporated in the second semiconductor chip 400 and which is comprised of the edge detecting circuit, the clock selecting circuit, the change-over circuit for the clock selecting circuits and the clock change-over switch is so arranged that the clock selecting circuits 109a and 109b, the clock change-over switch 111a and the change-over circuit 110a for the clock selecting circuits 109a and 109b shown in FIG. 12 are connected in the stages succeeding to the circuit equivalent to the edge detecting circuit 108a (FIG. 4) of the synchronous data transfer system according to the first embodiment of the invention.

The description which follows will be directed primarily to differences between the clock selecting circuit 109a; 109b, the clock change-over switch 111a and the change-over circuit 110a shown in FIG. 12 on one hand and the other hand the clock selecting circuits 109a and 109b and the change-over circuit 110a for the clock selecting circuit 109a; 109b (shown in FIGS. 5 and 6) in the system according to the first embodiment of the invention. A selector 410a of the waveform shaper 117 responds to the inputting of a latency signal which is a control signal generated internally of the second semiconductor chip 400 for thereby changing the timing at which the clock select information signal is sent out. In this manner, the data can be latched in timing with the CAS (column address strobe) latency for the memory device 402.

On the other hand, connected in the stages preceding to the change-over circuit 110a for the clock selecting circuits 109a and 109b are a counter 411 and a selector 410b for counting the cycle number, i.e., packet number of the data fed back from the memory device 402, for controlling the change-over circuit 110a for the clock selecting circuits 109a and 109b.

Figure 13:
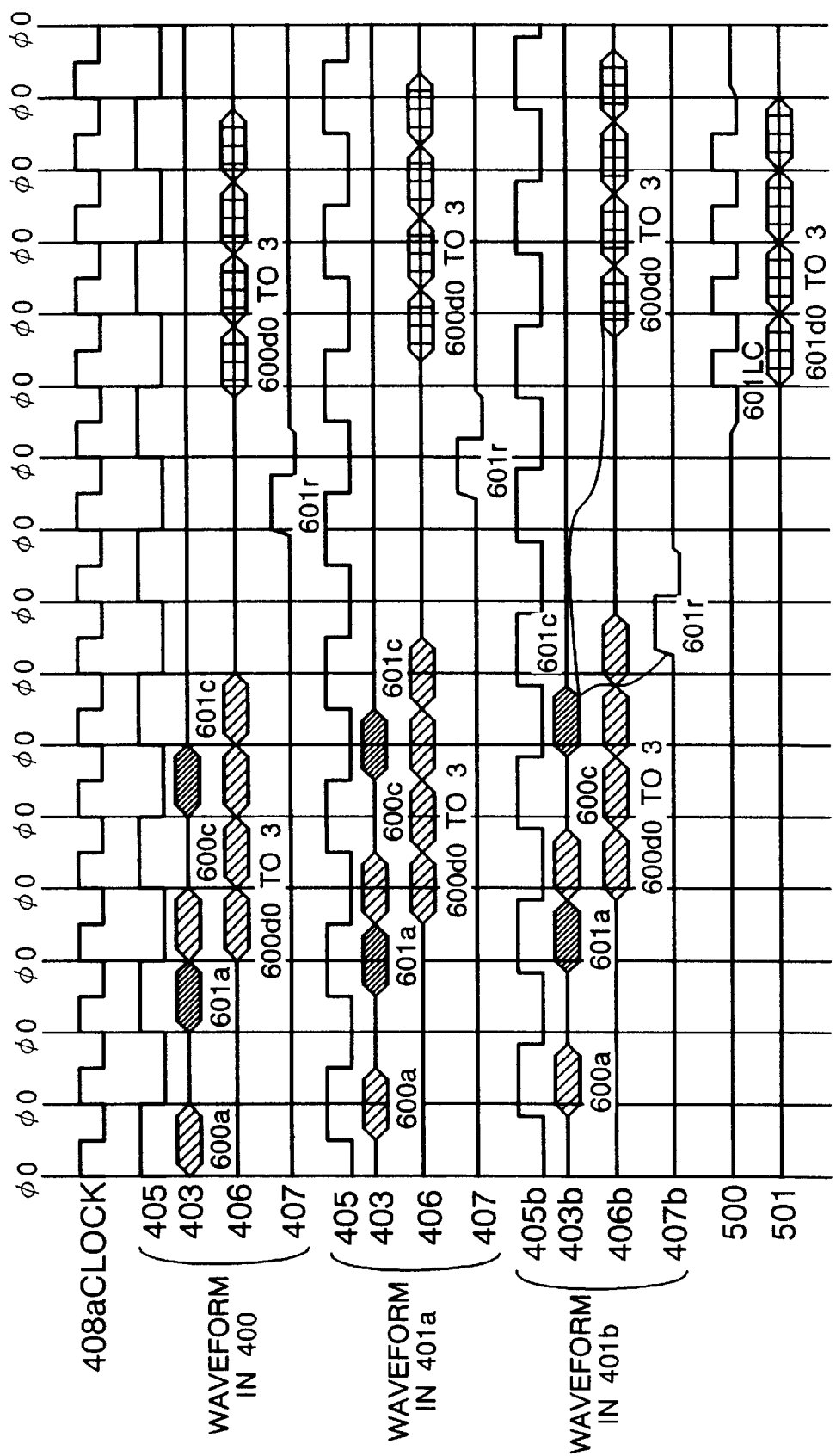
FIG. 13 is a chart for illustrating operation of the synchronous data transfer system.

FIG. 13 is a time chart for illustrating operation of the synchronous data transfer system according to the instant embodiment of the invention on the assumption that one second semiconductor chip (memory controller) 400 and two first semiconductor chips 401a and 401b are provided. Referring to FIG. 13, the operation of the synchronous data transfer system is conducted with reference to a clock signal 408a of the phase φ0 which is given by one of the phases of the clock signals of the phase-locked loop circuit 408. In this conjunction, it should be mentioned that the clock signal 408a is so selected as to correspond to a common multiple or a common divisor of the bus clock signal of the CPU bus (not shown in FIG. 13) to which the second semiconductor chip 400 is connected so that the clock signal 408a is synchronous with the bus clock signal of the CPU bus.

In the figure, the signals in the second semiconductor chip 400 are represented by a series of write operation waveforms designated by reference numeral 600 affixed with different suffixes and a series of read operation waveforms designated by reference numeral 601 affixed with various suffixes. Sent out from the second semiconductor chip 400 is an active packet 600a which contains a row address. After three cycles in accordance with the timing specification for the memory device 402, a command packet 600c which contains a column address and data 600d0 to 600d3 to be written, i.e., write data, are sent. This write operation is performed in synchronism with the clock signal 405 outputted constantly from the second semiconductor chip 400, whereby data represented by the waveforms 600a, 600c and 600d0 to 600d3 are latched by the memory device 402 in which the data are to be written, i.e., the memory devices 4021a and 4021b shown in FIG. 13.

Between the active packet 600a and the command packet 600c, an active packet 601a containing a row address is sent out. After three cycles in accordance with the timing specification for the memory device 402, a command packet 601c containing a column address is sent. Upon reception of the active packet 601a and the command packet 601c, the first semiconductor chip 401b outputs a loop-back clock 601r (RCLK) which serves as the phase reference signal from an address buffer 403b of the first semiconductor chip 401b onto the loop-back clock bus 407, wherein the loop-back clock 601r is received by the second semiconductor chip 400. In the second semiconductor chip 400, a clock signal 601LC for latching the data is selected from the loop-back clock 601r, whereby the read-out data 600d0 to 600d3 sent from the memory devices 4022a and 4022b are latched with the clock signal 601LC. The leading edge of the clock signal 601LC is aligned with the read-out data 600d0 in conformance with the CAS latency of the memory device 4022a; 4022b. The clock signal 601LC is outputted by a number equal to the number of packets for the read-out data 600d0 to 600d3.

In the second semiconductor chip 400, the CAS latencies for the memory devices 4021a, 4021b, 4022a and 4022b and the number of packets for the burst transfer in read/write operations are previously set in the registers of the memory devices 4021a, 4021b, 4022a and 4022b. Accordingly, the cycles in which the read-out data makes appearance as well as the number of the packets for the read-out data are known previously.

As is apparent from the foregoing description made by reference to FIGS. 10 to 13, in the synchronous data transfer system according to the present invention, the synchronous data transfer is realized by providing the control circuit 409 which includes the edge detecting circuit, the clock selecting circuit, the change-over circuit for the clock selecting circuits and the clock change-over switch for one of the semiconductor chips which are to participate in the data transfer. Such synchronous data transfer can equally be realized with the arrangement in which the phase-locked loop circuit 408 is provided in association with one of the semiconductor chips between which the data transfer is to be carried out while sparing the phase-locked loop circuit 408 in the other semiconductor chip.

Figure 14:
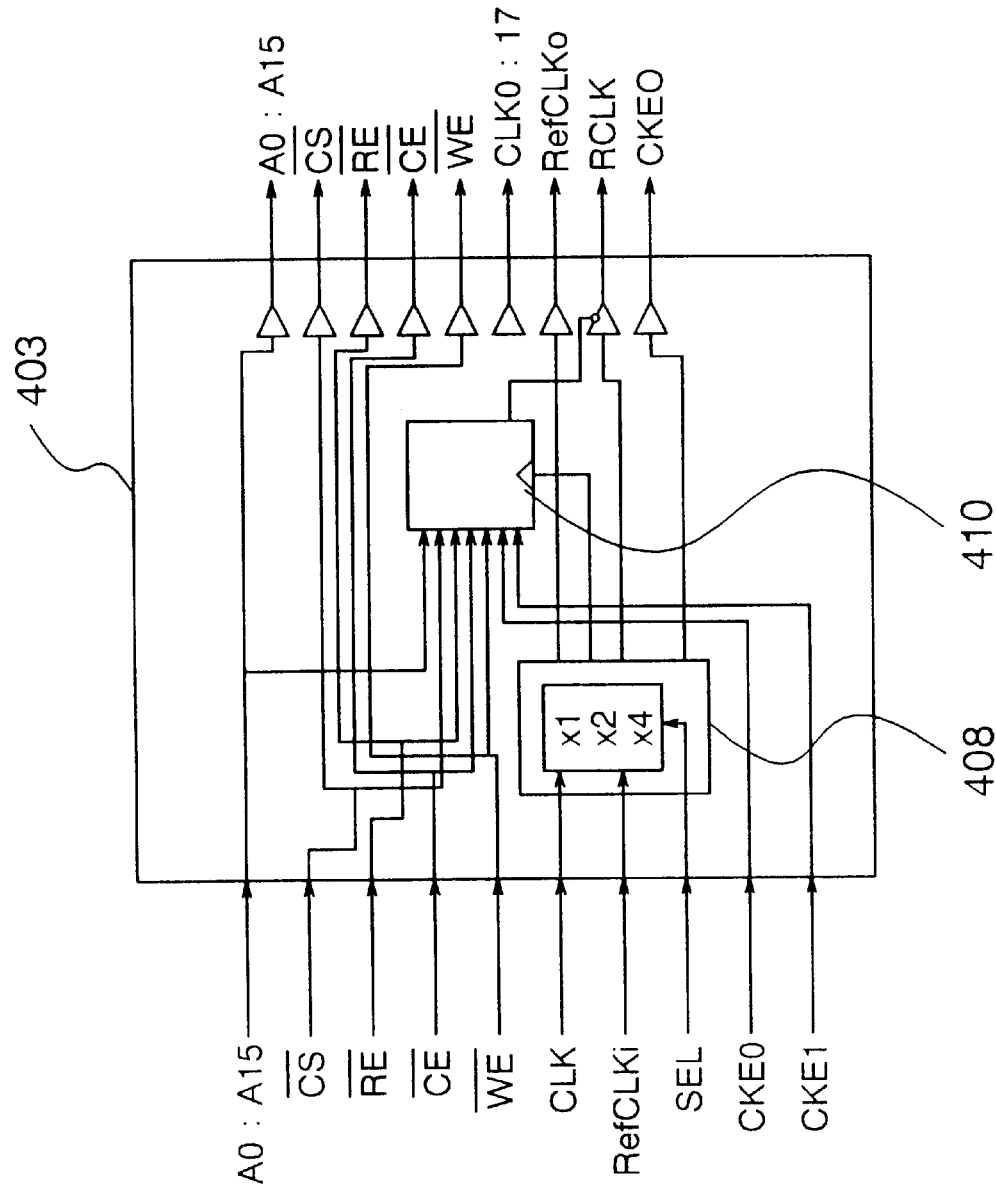
FIG. 14 is a diagram showing a structure of an address buffer.

FIG. 14 is a circuit diagram showing an internal structure of the address buffer 403 (FIG. 10) and connections of signal lines therefor in the synchronous data transfer system according to the second embodiment of the present invention. In the figure, reference numeral 408 designates a phase-locked loop circuit and 410 denotes a sequencer. The phase-locked loop circuit 408 is so set by the SEL signal that it can oscillate at a same frequency as that of the clock signal CLK and further can be changed to oscillation at a frequency duple or quadruple as high as the frequency of the clock signal CLK. The phase-locked loop circuit 408 outputs the clock signal as outputs CLK0:17 and RefCLKo.

As the phase adjusting function of the phase-locked loop circuit 408, the output RefCLKo is applied to the input RefCLKi, wherein the phase of the output RefCLKo is matched or aligned with that of the clock signal CLK inputted to the phase-locked loop circuit 408 by referencing the output RefCLKo. By virtue of such arrangement, the phase of the output CLK0:17 is also aligned with that of the clock signal CLK, whereby the circuit delay otherwise involved between the input clock signal CLK and the output RefCLKo of the address buffer 403 is cancelled out. Each of the outputs CLK0:17 of the phase-locked loop circuit 408 is connected to one or two memory device(s) 402 of the first semiconductor chip 401.

The sequencer 410 of the phase-locked loop circuit 408 detects the memory operation state from the address signal ADR, the command signal CMD and the control signals CNT, CKE0 and CKE1 inputted to the first semiconductor chip 401, to thereby turn on/off the output RCLK. According to the teachings of the present invention incarnated in the instant embodiment now under consideration, change/setting of the sequencer mode of the address buffer 403 is accomplished by adopting a combination "HL" and "LH" in addition to the conventional combination "simultaneous H" and "simultaneous L". In this manner, it is possible to set the register inherent to the address buffer 403 in addition to the setting of the register common to the address buffer 403 and the memory device 402.

Figure 15:
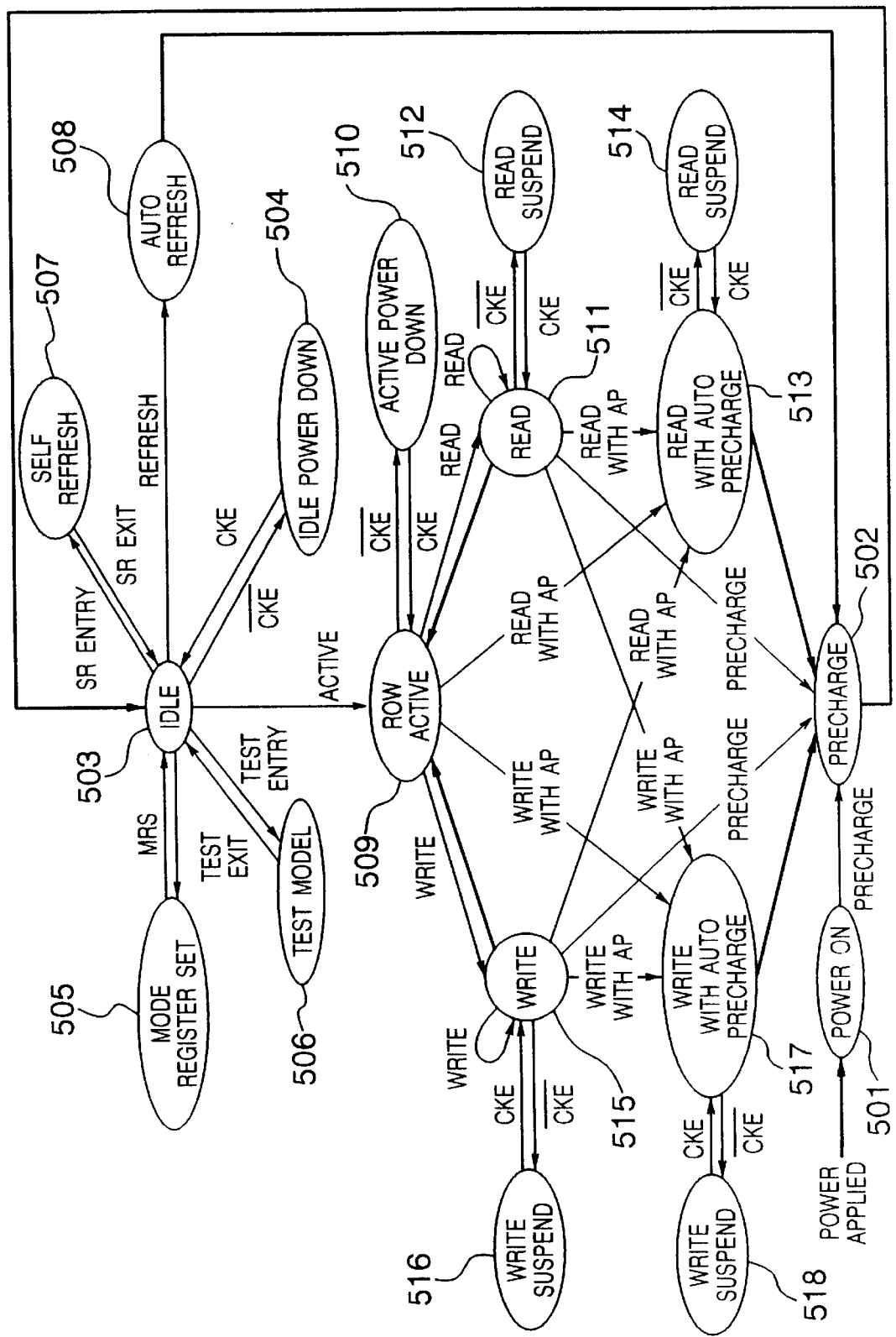
FIG. 15 is a status transition diagram for illustrating state transitions of a sequencer incorporated in a memory device.
Figure 16:
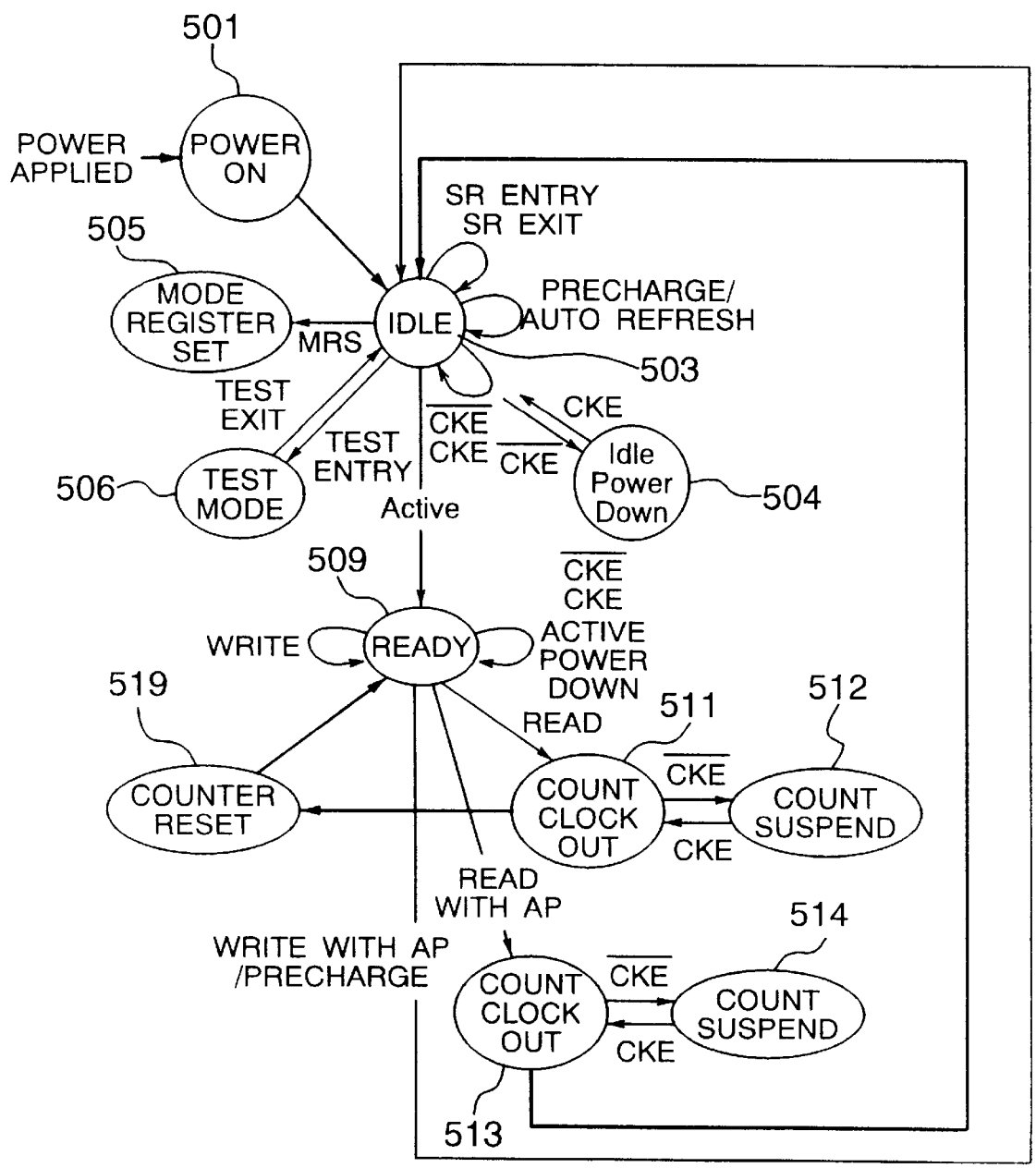
FIG. 16 is a status transition diagram for illustrating state transition of an address buffer incorporated in an address buffer.

Now, description will turn to the detection or grasp of the operation state of the synchronous DRAM mentioned hereinbefore in conjunction with FIG. 14 by reference to FIGS. 15 and 16, in which FIG. 15 is a status transition diagram for illustrating the status or state transition of the sequencer of the synchronous DRAM, and FIG. 16 is a status transition diagram illustrating the state transition of the address buffer 403 corresponding to the operation state illustrated in FIG. 15. The operation states illustrated in FIG. 16 bear correspondence relations to the operation states illustrated in FIG. 15. Thus, the address buffer 403 can detect or determine the operation state of the corresponding synchronous DRAM on the basis of the operation state thereof. In FIGS. 15 and 16, arrows in thick solid lines indicate automatic transitions to operation states indicated by the arrows upon completion of the predetermined operations indicated at the starting points of the arrows, respectively. Other arrows in thin lines represent the transitions to the operation states indicated by the arrows which are enabled only when the conditions imposed as indicated by the relevant signal lines are satisfied.

Referring to FIG. 15, upon power-on, the synchronous DRAM transits to an operation state 501. The synchronous DRAM interprets as a command the combination of the address signal ADR, the command signal CMD and the control signals CNT inputted from the second semiconductor chip 400 by way of the address buffer 403. Upon reception of the precharge command, the synchronous DRAM makes transition from the operation state 501 to an operation state 502. Upon completion of the precharge, the synchronous DRAM assumes automatically the idle state, i.e., an operation state 503. Upon reception of a mode register set command in the operation state 503, the synchronous DRAM transits to an operation state 505 for setting a mode register. Upon completion of the mode register setting, the synchronous DRAM automatically resumes the operation state 503. Further, in response to the reception of a self-refresh start command, the synchronous DRAM transits to an operation state 507 to thereby effectuate the self-refreshing. Upon reception of a self-refresh end command in the operation state 507, the synchronous DRAM returns to the operation state 503. Furthermore, in response to the reception of a test entry command, the synchronous DRAM transits to an operation state 506 to thereby execute the test. In response to the reception of a test exit command in this state, the synchronous DRAM returns to the operation state 503. On the other hand, upon reception of the refresh command, the synchronous DRAM makes transition to an operation state 508 to start the automatic refreshing operation. Upon completion of the auto-refresh operation, the synchronous DRAM automatically resumes the operation state 502.

When the precharge operation has been completed, the synchronous DRAM automatically resumes the operation state 503. In the synchronous data transfer system according to the second embodiment of the present invention, the OS (operating system) and user programs are loaded upon completion of the test, initialization and the setting to the starting mode, whereupon transition is made to the ordinary operation mode. In that case, the synchronous DRAM assumes the operation state 503 as the steady state in which data read-out/write-in operation is performed in response to reception of the read-out/write-in command.

In any case, the second semiconductor chip 400 issues the active command in the operation state 503, while the synchronous DRAM makes transition to an operation state 509 upon reception of the active command. When the read-out command is received in this state, transition is made to an operation state 511 where the data read out on the basis of the information set previously at the register of the synchronous DRAM in the operation state 505 is outputted. Upon completion of the read-out operation, the synchronous DRAM automatically resumes the operation state 509. In the case where other command such as the post-read precharge command, the write command, the post-write precharge command and/or precharge command is received before the read-out operation is completed, state transition is made to the operation state 513, 515, 517 or the operation state 502.

When the write command is received in the operation state 503, transition is made to the operation state 515 where the data written on the basis of the information set previously at the register of the synchronous DRAM in the operation state 505 is written in the memory array. Upon completion of the write operation, the synchronous DRAM automatically resumes the operation state 509. In the case where other command such as commands for precharge after the writing, read-out, precharge after the read-out or precharge is received before the write operation is completed, the state transition is made to the operation state 517, 511, 513 or the operation state 502.

Upon reception of the precharge command in succession to the read-out operation in the operation state 503, the synchronous DRAM makes transition to the operation state 513. At the end of the read-out operation, the synchronous DRAM automatically resumes the operation state 502. Similarly, upon reception of the precharge command in succession to the write-in operation in the operation state 503, the synchronous DRAM makes transition to the operation state 517. At the end of the write-in operation, the synchronous DRAM automatically resumes the operation state 502. When the synchronous DRAM transits to the operation state 502 after the read-out/write-in operation, the synchronous DRAM is precharged and transits automatically to the operation state 503 after completion of the precharge.

When the CKE signal is negated in the operation state 503, transition is made to an operation state 510 which is a power-down state, whereby the original operation state is restored by asserting the CKE signal. When the CKE signal is negated in the operation state 511, 513, 515 or 517, transition is made to the operating state 512, 514, 516 or 518 which has been suspended up to the current time point, whereby the original operating state is resumed by asserting the CKE signal.

FIG. 16 is a status transition diagram which is depicted on the basis of the operation of the synchronous DRAM described above and illustrates how the address buffer 403 grasps or detects the operation states of synchronous DRAM supplied with the address signal ADR, command signal CMD, control signals CNT and the clock signal CLK from the address buffer 403 to thereby control the output of the loop-back clock signal RCLK on the basis of the result of the detection.

More specifically, the address buffer 403 makes transition to the operation state 501 in response to the power-on and thence to the operation state 503 automatically. In the operation state 503, the address buffer 403 is held in the operation state 503 without any status transition regardless of the precharge, self-refresh and auto-precharge commands for the synchronous DRAM. Upon reception of the mode register setting command for the synchronous DRAM, the address buffer 403 transits to the operation state 505, while resuming the original operation state 503 upon completion of the setting of the mode register.

The mode register set as mentioned above is compatible with a mode register incorporated in the synchronous DRAM. Thus, the sequencer of the address buffer 403 makes reference to the mode register in the synchronous DRAM to allow the address buffer 403 to detect the CAS latency, burst length, etc. involved in the read/write operation for the synchronous DRAM. Further, in response to the reception of the test entry command for the synchronous DRAM in the address buffer 403, the synchronous DRAM transits to an operation state 506, while returns to the original operation state 503 in response to the test exit command. On the other hand, upon reception of the active command for the synchronous DRAM in the operation state 503, the address buffer 403 transits to the operation state 509. In the operation state 509, the address buffer 403 undergoes no transition due to the write command. Thus, the address buffer 403 is held in the operation state 509.

When the read command is received, the address buffer 403 transits to the operation state 511 to start outputting of the loop-back clock signal RCLK. The sequencer incorporated in the address buffer 403 starts count operation in the operation state 511 for controlling the output of the loop-back clock signal RCLK by referencing the CAS latency and the burst length which are set or placed in the mode register. Upon completion of the output of the loop-back clock signal RCLK, the address buffer 403 automatically transits to an operation state 519 to reset the count value to zero, whereupon the address buffer 403 makes transition to the operation state 509 automatically.

FIGS. 17A and 17B shows a structure of the first semiconductor chip according to the second embodiment of the present invention. In FIGS. 17A and 17B, reference numeral 401 denotes the first semiconductor chip serving as a memory module, 402 denotes a memory device and a numeral 403 denotes an address buffer. Parenthetically, FIG. 17A shows a first surface of the semiconductor chip while FIG. 17B shows the other surface thereof. As can be seen in FIG. 17A, nine memory devices 402 are disposed in an array. Each of the memory devices 402 is implemented as the synchronous DRAM which has an 8-bit data line. Accordingly, the number of the data lines amounts to 72 bits in sum total at the signal terminal of the first semiconductor chip 401. Of the 72 bits of the data lines, 8 bits are redundant bits which are used as a code for error checking and correction.

Disposed underneath the array of nine memory devices 402 at locations between the fourth and fifth devices and between the fifth and sixth devices as counted from the left or right side in FIG. 17A are the address buffers 403, respectively. At the bottom of the first semiconductor chip 401 as viewed in FIG. 17A, eighty-four signal terminals made of copper are disposed in an array. Similar array of the eighty-four signal terminals is provided on the other surface of the first semiconductor chip 401, as can be seen in FIG. 17B.

The total number of the signal terminals on the one and other surfaces of the first semiconductor chip amounts to 168. These terminals are connected to signal lines provided on the first semiconductor chip as signal terminals and voltage source terminals. Disposed additionally on the other surface of the semiconductor chip are nine memory devices 402, each of which is implemented as the synchronous DRAM having an 8-bit data line. Accordingly, at the signal terminal of the first semiconductor chip 401, the bit number of the data lines amounts to 72 bits in sum total. These data lines interconnect printed circuit wirings on the other surface of the semiconductor chip with those on the one surface through via-holes formed in the substrate. Thus, these data lines are connected to the 72-bit data lines of the copper signal terminals of the first semiconductor chip.

One of two or more clock signal lines of the signal terminals of the first semiconductor chip 401 including the arrays of memory devices 402 provided on both surfaces is connected to the nine memory devices 402 on one surface with the other being connected to the nine memory devices 402 provided on the other surface.

Figure 18:
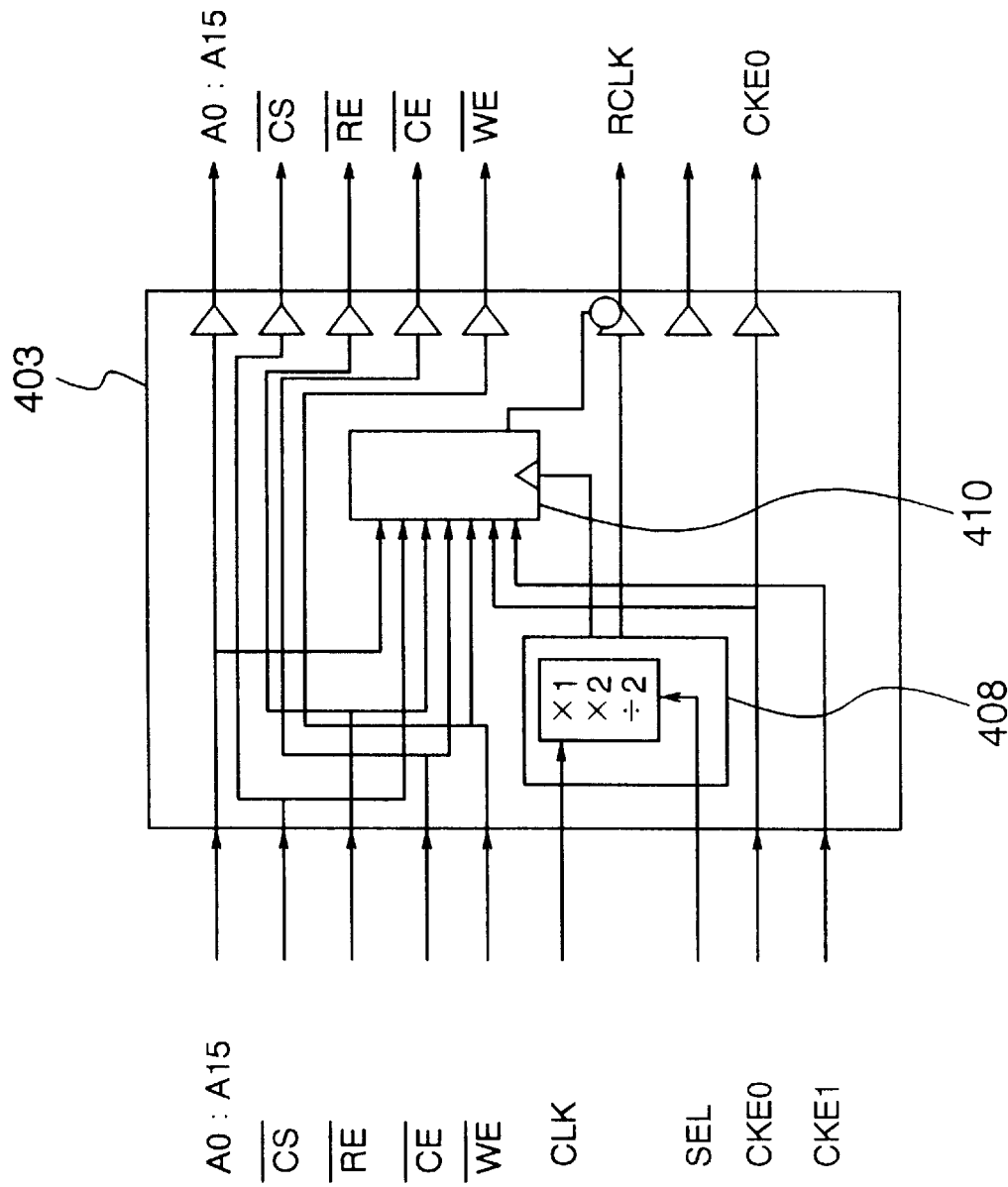
FIG. 18 is a view showing another structure of the address buffer.

FIG. 18 shows another address buffer 403 according to the second embodiment of the present invention. The following description will be directed to differences of the address buffer 403 now under consideration from the address buffer 403 described hereinbefore by reference to FIG. 14. In FIG. 18, reference numeral 408 designates a phase-locked loop circuit and a numeral 410 denotes a sequencer. The phase-locked loop circuit 408 is so set up by the SEL signal that it can oscillate at a same frequency as that of the clock signal CLK and further can be changed over to the oscillation at a frequency duple or quadruple as high as the frequency of the clock signal CLK. The phase-locked loop circuit 408 is so designed as to match the phase of the loop-back clock signal RCLK with that of the clock signal CLK inputted to the phase-locked loop circuit 408.

The address buffer 403 is supplied with the clock signal CLK from the address buffer 403 shown in FIG. 14 or a commercially available clock buffer incorporated in the phase-locked loop circuit. Accordingly, distribution of the output CLK0:17 is left in the charge of the address buffer 403 shown in FIG. 14 and thus the output CLK0:17 is spared in the address buffer 403 shown in FIG. 18. Consequently, the address buffer 403 is not in the position to supply the clock signal CLK to the memory devices 402 of the first semiconductor chip 401.

By mounting the address buffer 403 shown in FIG. 14 and the address buffer 403 now under discussion on one and the same first semiconductor chip 401, the number of the memory devices 402 to which the address signal ADR[11:0], command signal CMD[2:0] and the control signal CNT[2:0] are to be distributed from the single address buffer 403 can be decreased by half. In the case of the first semiconductor chip 401 shown in FIG. 17, the eighteen memory devices 402 mounted on the first semiconductor chip 401 are grouped into two groups. By virtue of such arrangement, distortion of the propagating waveforms due to reflection or the like of the address signal ADR[11:0], command signal CMD[2:0] and the control signal CNT[2:0] and others in the first semiconductor chip 401 can be improved with the propagation delay time being shortened.

The sequencer 410 of the phase-locked loop circuit 408 monitors the operation states of the memory for thereby turning on/off the loop-back clock signal RCLK as outputted, as in the case of the address buffer 403 shown in FIG. 14. In the first semiconductor chip 401, there are available two loop-back clock signals RCLK, i.e., the loop-back clock signal RCLK of the address buffer 403 shown in FIG. 14 and that of the address buffer 403 now under consideration. In this conjunction, it should be mentioned that the synchronous data transfer system according to the present invention can operate satisfactorily either in case the first mentioned loop-back clock signal RCLK is connected to one signal terminal of the first semiconductor chip 401 or in case both the loop-back clock signals RCLK are connected to two signal terminals of the first semiconductor chip 401.

In particular, in the case where only the second mentioned loop-back clock signal RCLK is connected, the phase of the loop-back clock signal RCLK received at the second semiconductor chip 400 approximates the phase of the data DATA received in succession at the second semiconductor chip 400. In order to allow both the loop-back clock signals RCLK mentioned above to be connected, respectively, so that the loop-back clock signals RCLK can be received on a two-bit basis at the second semiconductor chip 400, it is required to provide the second semiconductor chip 400 internally with two sets of control circuits 409 each including the edge detecting circuit, clock selecting circuits, change-over circuit for the clock selecting circuits and the clock change-over switch. Because of the availability of the phase information detected by the two sets of the control circuits 409 each including the edge detecting circuit, the clock selecting circuits, the change-over circuit for the clock selecting circuits and the clock change-over switch, variance in the phase of the data DATA can be estimated on the basis of the difference in the phase between the first and second mentioned loop-back clock signals RCLK, whereby the phase information can be generated internally of the second semiconductor chip with remarkably high accuracy.

Figure 19:
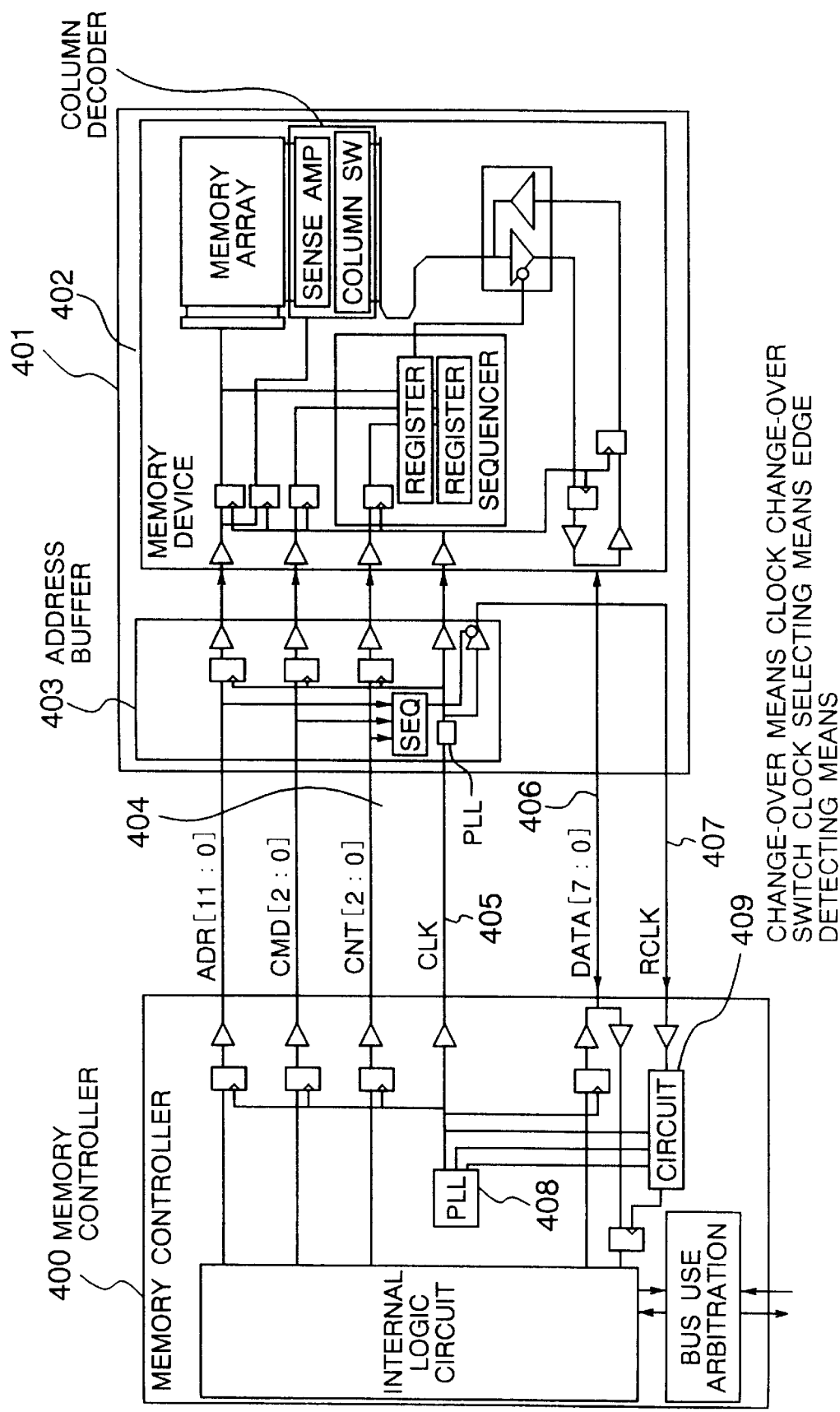
FIG. 19 is a diagram showing interconnection or wiring of signal lines in a memory device.

FIG. 19 is a circuit diagram showing a configuration of the synchronous data transfer system according to a third embodiment of the present invention. The following description concerning the third embodiment will be directed to differences thereof from the synchronous data transfer system according to the second embodiment of the invention described hereinbefore by reference to FIG. 10. Referring to the figure, the address buffer designated equally by the reference numeral 403 latches once the address signal ADR[11:0], the command signal CMD[2:0] and the control signals CNT[2:0] with the flip-flop (FF) circuitry. In the case of the synchronous data transfer system shown in FIG. 10, the path extending from the flip-flop circuitry of the second semiconductor chip 400 to those of the data latch circuit incorporated in the memory device 402 constitutes one section of the propagation path.

By contrast, in the case of the synchronous data transfer system shown in FIG. 19, there are provided two separate propagation paths, i.e., one extending from the flip-flop circuitry of the second semiconductor chip 400 to the flip-flop circuitry constituting the data latch means incorporated in the address buffer 403 and the other extending from the same flip-flop circuitry incorporated in the address buffer 403 to the flip-flop circuitry constituting the data latch circuit of the memory device 402.

The data cycle time is determined on the basis of a greater value between a total sum of variance in the circuit delay time, variance in the propagation delay time and the clock skew and a total sum of the set-up times and the hold times of the flip-flop circuitry of the second semiconductor chip 400, the flip-flop circuitry of the address buffer 403 and the latch means of the memory device 402, respectively. By dividing the propagation path extending through the address buffer 403 shown in FIG. 19 into two sections, variance in the circuit delay time and variance in the propagation delay time as well as the clock skew in each section can be reduced, whereby the cycle time can be shortened to ensure a high-speed operation performance.

Further, in the conventional synchronous bus system, the data cycle time is determined by a total sum of the circuit delay time, the propagation delay time and the clock skew. When the address buffer 403 in the synchronous data transfer system of the present invention is applied to the conventional synchronous bus, the propagation path is divided into two sections, whereby the circuit delay time and the propagation delay time in each section can be reduced. Thus, the cycle time of the synchronous bus hitherto known can be shortened, which contributes to a high-speed operation performance.

Figure 20:
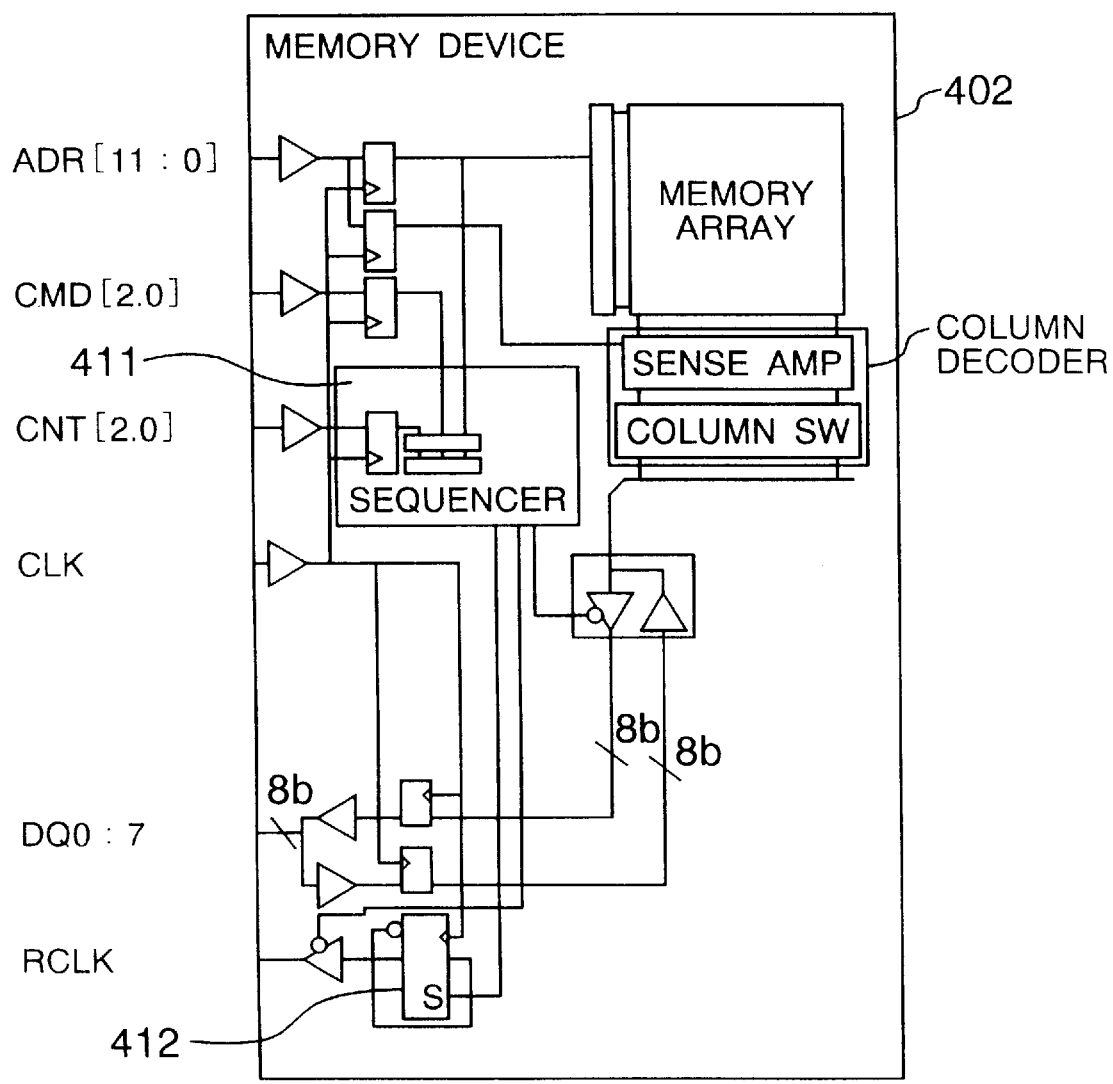
FIG. 20 is a view for illustrating operation of a synchronous data transfer system according to a third embodiment of the present invention.

Next referring to FIGS. 20 and 21, a fourth embodiment of the present invention will be described. FIG. 20 shows a structure of a memory device employed in the synchronous data transfer system according to the fourth embodiment and designed to return the loop-back clock signal RCLK by itself. In FIG. 20, reference numeral 411 denotes a sequencer and 412 denotes a frequency divider. When the memory device 402 receives a read request, the sequencer 411 starts division of the frequency of the clock signal CLK as received with the frequency divider 412 to thereby output the frequency-divided clock signal as the loop-back clock signal RCLK. Subsequently, upon reception of a data read-out request, the data DATA is outputted with a delay corresponding to the CAS latency set at the register incorporated in the sequencer. Upon completion of the data read operation, the sequencer 411 sets the frequency divider 412 to "H". In this way, the loop-back clock signal RCLK outputted from the frequency divider has the first period which always begins with "H".

Figure 21:
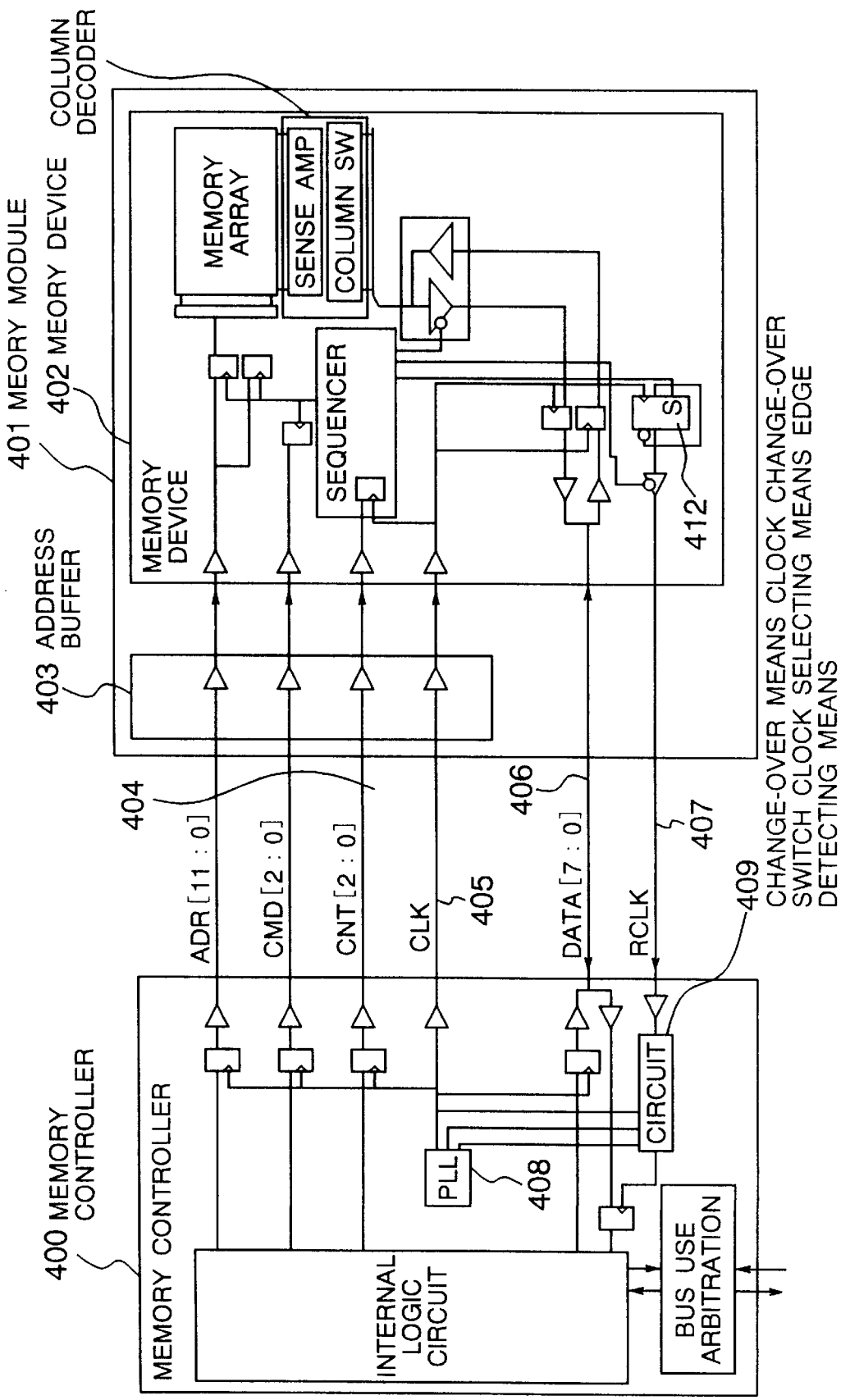
FIG. 21 is a view for illustrating operation of a synchronous data transfer system according to a fourth embodiment of the present invention.

In the memory system shown in FIG. 21, there is employed an address buffer provided with no conventional output terminal for the loop-back clock signal RCLK together with the memory device shown in FIG. 20.

Next referring to FIGS. 22, 23, 24A, 24B, 25A and 25B, a fifth embodiment of the present invention will be described.

Figure 22:
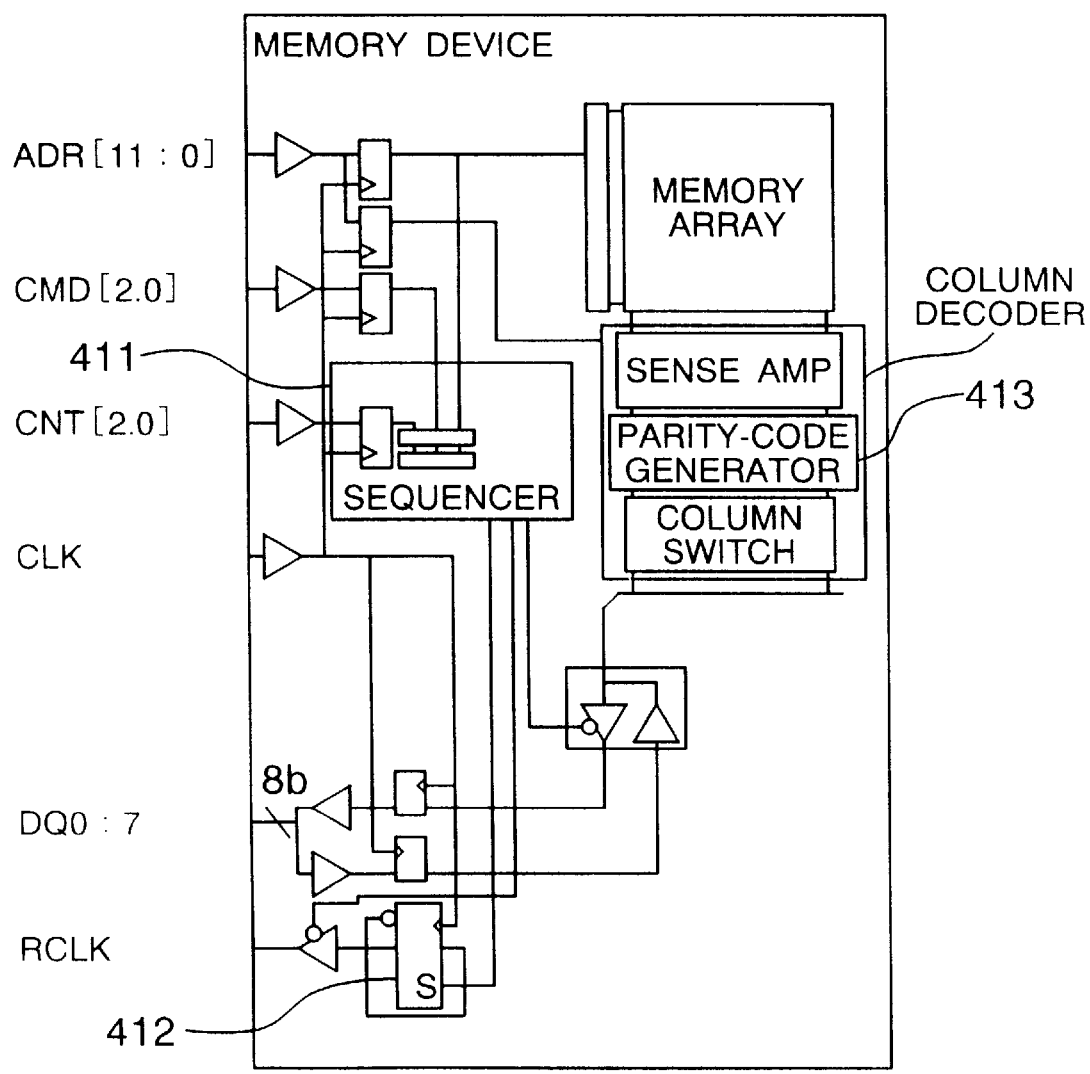
FIG. 22 is a view showing an internal structure of a memory device having one-bit input and output.

FIG. 22 shows a memory device constituting a synchronous DRAM having a data signal line of one bit. In the figure, reference numeral 411 denotes a sequencer, 412 denotes a frequency divider, and numeral 413 denotes a parity-code generator. The following description will be directed to differences from the synchronous DRAM described previously by reference to FIG. 20. In the synchronous memory de vice shown in FIG. 22, a parity-code generator 413 is disposed between a sense amplifier and a column switch incorporated in a column decoder. When an active command is received by the memory device 402, one row of memory cells in the memory array corresponding to the row address are selected by a row decoder.

The sense amplifiers are provided for one row so that the memory cells can be connected to the sense amplifiers in one-to-one correspondence. Electric charges of the memory cells as selected are amplified by the associated sense amplifiers, respectively, to be outputted to the column switch via signal lines. In response to the reception of the read command signal, the column switch selects the signal line corresponding to the column address received. The address is counted up or incremented, starting from the burst length placed in a register built in the sequencer. Thus, the column switch outputs a succession of data by switching sequentially the signal lines from one to another.

The parity-code generator 413 is connected to the signal line disposed between the sense amplifier and the column switch, to generate a parity on the basis of the data of a burst length, i.e., length from the data of the signal line corresponding to the column address to the data of the signal line corresponding to the address more significant by the burst length from the column address. The parity generation by the parity-code generator 413 is started at the time point when the data amplified by the sense amplifier and outputted to the signal line arrives at the parity-code generator 413. Accordingly, at the time point when the column switch is changed over to a more significant address from the signal line corresponding to the column address, generation of the parity is ended. When the data corresponding to the burst length has been outputted, the column switch selects the signal line extending from the parity-code generator, to thereby allow the parity to be outputted during a cycle succeeding to the data of the burst length.

In the case of the instant embodiment of the invention, the parity-code generator 413 is mounted. However, an ECC (Error checking and correction)-code generator may equally be employed for outputting a number of bits required for the error checking and correction during a cycle succeeding to the data of the burst length.

Figure 23:
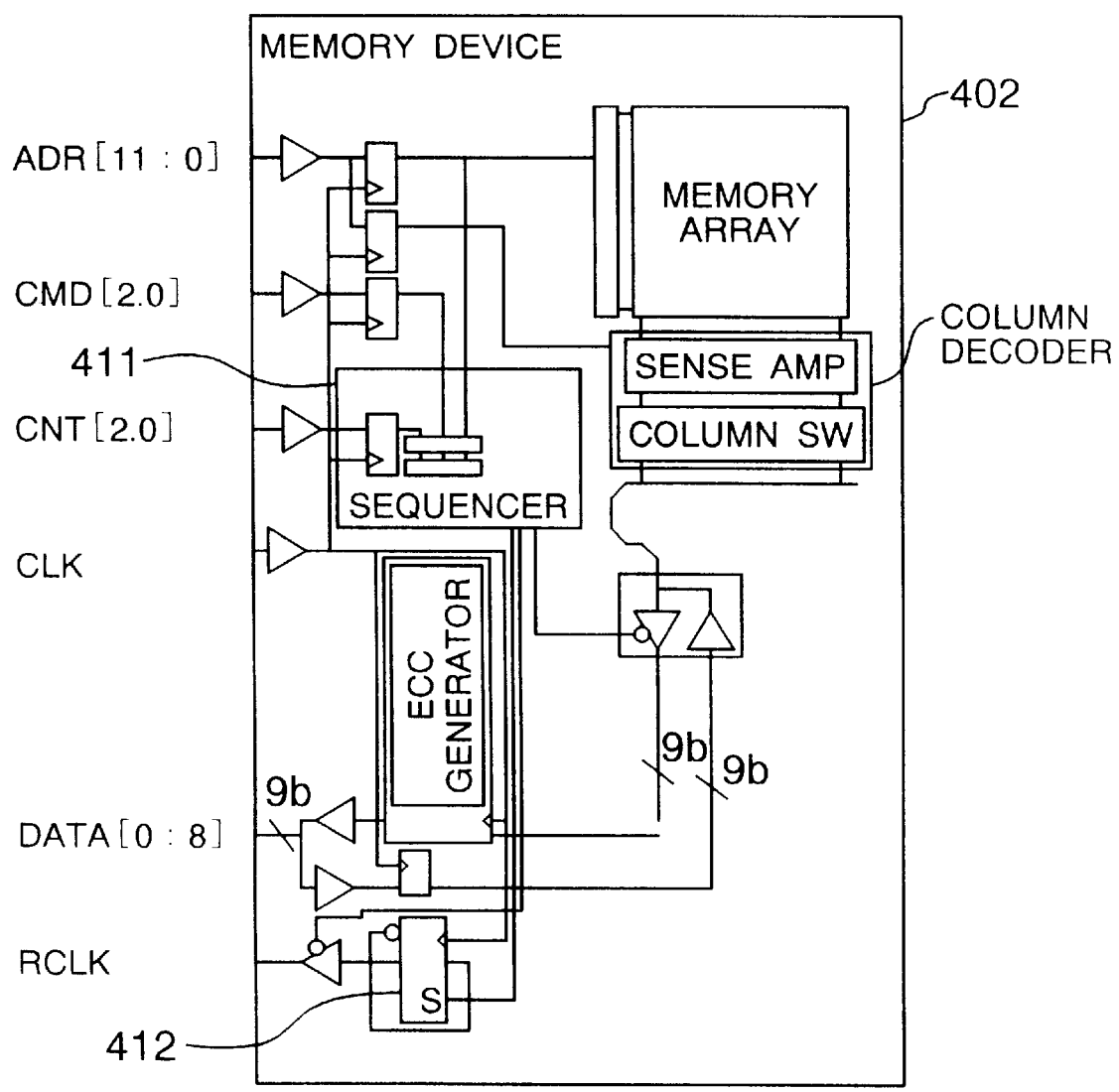
FIG. 23 is a view showing an internal structure of a memory device having multi-bit input and output.

FIG. 23 shows a memory device constituting a synchronous DRAM having a data signal line of nine bits. In the figure, reference numeral 411 denotes a sequencer, 412 denotes a frequency divider, and numeral 414 denotes a ECC (Error Checking and Correction)-code generator. The following description will be directed to differences from the synchronous DRAM described previously by reference to FIG. 22. In the synchronous memory device shown in FIG. 23, the ECC-code generator 414 is disposed at the stage preceding to the output buffer. When an active command is received by the memory device 402, one row of memory cells in the memory array corresponding to the row address are selected by a row decoder. The sense amplifiers is provided for one row so that the memory cells can be connected to the sense amplifiers in one-to-one correspondence.

Electric charges of the memory cells as selected are amplified by the associated sense amplifiers, respectively, to be outputted to the column switch via signal lines. In response to the reception of the read command signal, the column switch selects the signal line corresponding to the column address received. The address is counted up or incremented, starting from the burst length placed in a register built in the sequencer. Thus, the column switch outputs a succession of data by switching sequentially the signal lines from one to another.

The ECC-code generator 414 holds the data outputted from the column switch to thereby generate an ECC redundancy code from the data of the burst length. The redundant code generated by the ECC-code generator 414 is outputted during a cycle succeeding to the outputting of the burst-length data. In the synchronous data transfer system according to the instant embodiment of the invention, the ECC redundant code of 9 bits is generated for the data of 36 bits in total, i.e., for the four burst-length data each of nine bits. The ECC redundant code as generated is outputted in one cycle.

Figure 24B:
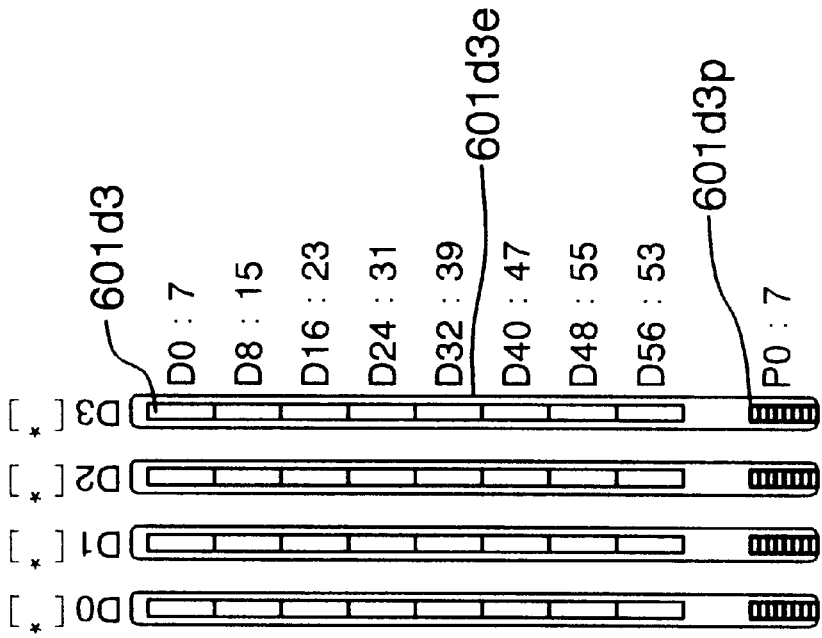
FIGS. 24A and 24B are views for illustrating relations between data and redundant bits transferred in a memory system.
Figure 24A:
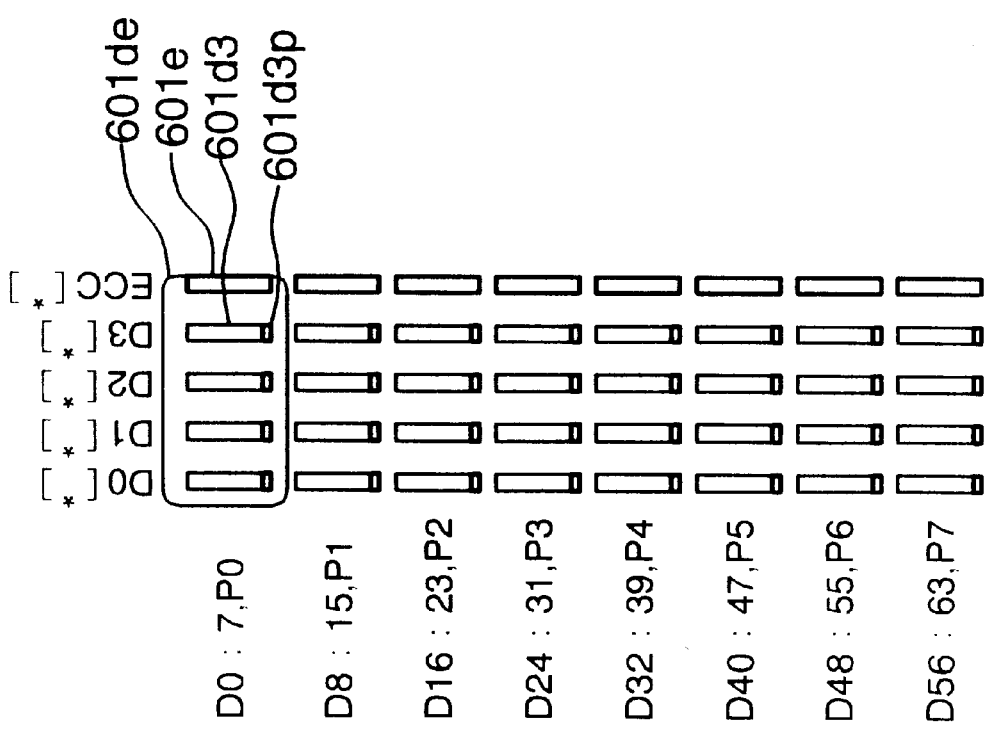

FIGS. 24A and 24B are views for illustrating relation between the data and the ECC redundant code in the read operation mode for the first semiconductor chip which includes the memory devices shown in FIG. 23. In the figures, reference character 601$de$ designates the data and the ECC redundant code outputted from one memory device mounted on the first semiconductor chip. Further, reference characters 601$d$3 and 601$d$3p designate the data and the redundant bit outputted at the fourth cycle in the data output cycles. The ECC redundant code generated on the basis of the data and the redundant bits during the period from the first to the fourth cycle is denoted by 601$e$.

Upon reception of the ECC redundant code 601$e$, the second semiconductor chip performs the error checking and correction on the basis of the code 601$e$. Subsequently, the data and the redundant bits in the first to fourth cycles are reedited into a data train designated by 601$d$3e. Taking as example the data and the redundant code in the fourth cycle as rearrayed, it can be seen that the fourth cycle contains the 64-bit data 601$d$3 and the redundant code 601$d$3p corresponding to the data 601$d$3. Thus, in the second semiconductor chip, the error checking and correction are again carried out on the basis of the ECC redundant code 601$d$3p.

The redundant code 601$d$3p used in the error checking or detection is the redundant code generated upon writing operation performed by the second semiconductor chip for the first semiconductor chip and written in the memory device. On the other hand, in the write operation performed by the second semiconductor chip for the first semiconductor chip, only the data from the first to fourth cycle, exclusive of the ECC redundant code used in the read operation, is written. Thus, the ECC redundant code is effective only in the read operation.

Due to the duplicate redundant codes described above in conjunction with the system according to the instant embodiment of the invention, the write error in the write operation from the second semiconductor chip to the memory is held as it is. Upon reading operation, the ECC redundant code 601$e$ is generated on the basis of the error-suffering data, whereupon the error checking and correction is performed in the second semiconductor chip. Thus, the error involved in the write operation is not detected in the error checking and correction of the redundant code 601$e$ but detected in the error checking and correction of the redundant code 601$d$3p.

Furthermore, in the case where the data is written correctly and suffers error during the transfer of the data read out in the read operation between the first semiconductor chip and the second semiconductor chip, this error is detected by the error checking and correction with the redundant code 601$e$, whereupon the error is corrected within a range in which the correction is possible in view of the bit number of the redundant code. When the data as received is corrected perfectly, the error checking and correction is performed with the redundant code 601$d$3p.

As is apparent from the above description, when occurrence of error is specified or identified in the write operation for the memory, the second semiconductor chip evades the error by adjusting the phase relation between the data to be written and the clock signal CLK owing to the duplicate redundant code. On the other hand, when error event is specified in the read operation, the correspondence table between the phase information extracted from the loop-back clock signal RCLK and the latch-destined clock to be selected is so altered as to evade the error.

Figure 25A:
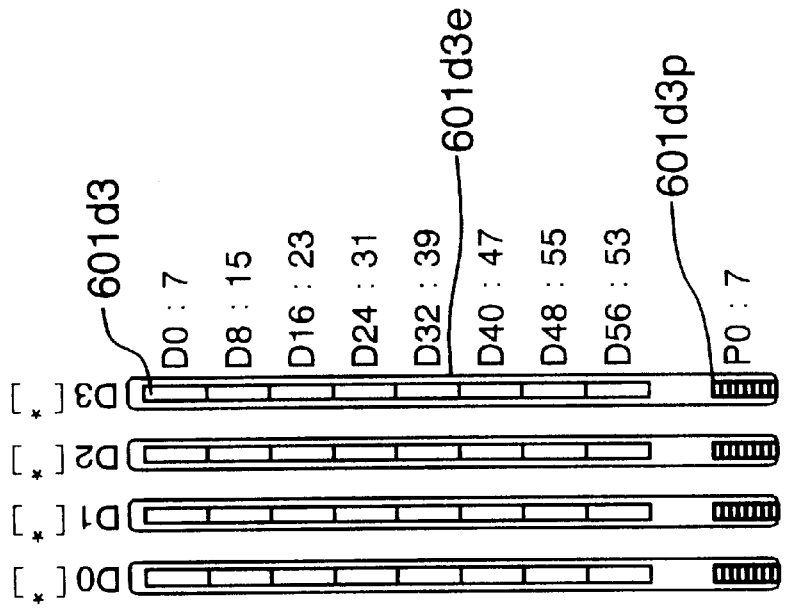
FIGS. 25A and 25B are views for illustrating another example of relations between data and redundant bits transferred in a memory system.
Figure 25B:
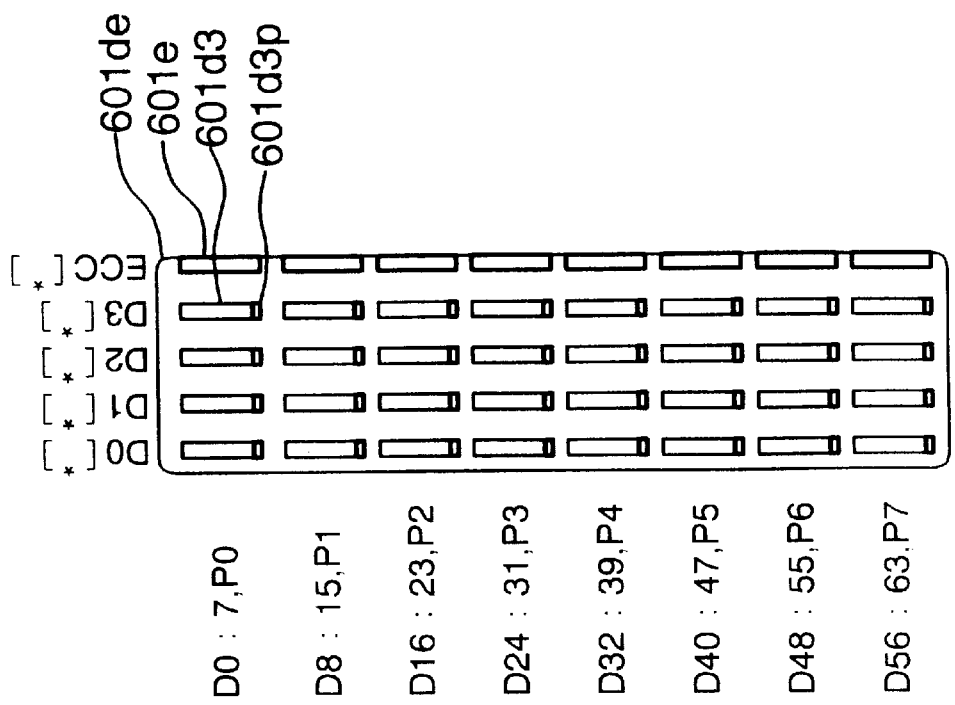

FIGS. 25A and 25B are views for illustrating another combination of the redundant codes. At this juncture, description is directed to the differences from the combination shown in FIGS. 24A and 24B. For the data of 288 bits in sum total in the first to fourth cycles of the data/redundant code combination 601de, the ECC redundant code 601e of 72 bits is generated to be outputted. The ECC redundant code of 72 bits in the system according to the instant embodiment of the invention is a Reed-Solomon code and serves for error detection on a one-byte basis up to the five bytes of data and error correction on a one-byte basis up to four bytes. When compared with the structure of the redundant code shown in FIG. 24, the range for the error detection and correction is widened.

What is claimed is:

1. A synchronous data transfer system, comprising:
   oscillation means for generating a clock signal for a predetermined transfer cycle for data transfer;
   a plurality of nodes connected to said oscillation means, each node includes at least an internal logic circuit for performing a predetermined data processing, each node outputs a phase reference signal indicating phase of said clock signal, data processed by said internal logic circuit of said node in response to said phase reference signal, and a transfer end signal indicating an end of transferring data processed by said internal logic circuit, respectively, in synchronism with said clock signal;
   a phase reference signal bus connected to each node for transmitting said phase reference signal;
   a data bus connected to each node for transmitting said data; and
   a transfer end signal bus connected to each node for transmitting said transfer end signal,
   wherein at least one of said nodes is a sender node which includes sending means for sending data to a receiver node, which is provided by at least one of said nodes on said data bus with a delay after said phase reference signal transmitted to said phase reference signal bus by said sender node, and sending simultaneously said transfer end signal to said receiver node on said transfer end signal bus, and
   wherein said receiver node includes at least selecting means for converting said phase reference signal from said sender node into phase information which is used to select a clock signal having a predetermined phase based on said clock signal received by said receiver node, and receiving means for receiving said data from said sender node by using said clock signal selected based on said phase information.

2. A synchronous data transfer system set forth in claim 1, wherein at least one of said nodes is a sender node which only transmits data, at least one of said nodes is a receiver node which only receives data, and at least one of said nodes is a sender/receiver node for sending and receiving data.

3. A synchronous data transfer system set forth in claim 1, wherein a transfer cycle is determined to be shorter than a total sum of a propagation delay time involved between said sender node and said receiver node, a delay time of an output circuit provided in said sender node, and a delay time of an input circuit provided in said receiver node, wherein said phase reference signal, said data and said transfer end signal are output from said sender node to said receiver node in synchronism with the clock signal for said transfer cycle.

4. A synchronous data transfer system set forth in claim 3, wherein operation frequency of the clock signal for said transfer cycle bears a relation given by an integral ratio relative to operation frequency of said internal logic circuits incorporated in said sender node and said receiver node, respectively.

5. A synchronous data transfer system set forth in claim 1, further comprising:
   bus privilege arbitration means connected to said sender node for outputting to said sender node an arbitration cycle for a bus privilege authorizing use of said phase reference signal bus, said data bus and said transfer end signal bus, wherein said arbitration cycle is so established that when said sender node receives said transfer end signal, said bus privilege authorizing use of said phase reference signal bus, said data bus and said transfer end signal bus is assigned to said sender node, and wherein upon assigning of said bus privilege from said bus privilege arbitration means, said sender node sends out said phase reference signal onto said phase reference signal bus, then said data onto said data bus, and then said transfer end signal onto said transfer end signal bus.

6. A synchronous data transfer system set forth in claim 5, wherein said arbitration cycle is covered by said transfer cycle for said data transferred from said sender node assigned with said bus privilege, while said transfer cycle for said phase reference signal from said sender node assigned with said bus privilege is covered by said transfer cycle for said data transferred from said sender node assigned with said bus privilege.

7. A synchronous data transfer system, comprising:
   oscillation means for generating a clock signal for a predetermined transfer cycle for data transfer;
   a plurality of nodes connected to said oscillation means, each node includes at least an internal logic circuit for performing a predetermined data processing, each node outputs a phase reference signal indicating phase of said clock signal, data processed by said internal logic circuit of said node in response to said phase reference signal, and a transfer end signal indicating an end of transferring data processed by said internal logic circuit, respectively, in synchronism with said clock signal; and
   at least a phase reference signal bus for transmitting said phase reference signal, a data bus for transmitting said data, and a transfer end signal bus for transmitting said transfer end signal, wherein each of said phase reference signal bus, said data buss and said transfer end signal bus are connected to each of said nodes;
   each of said nodes includes:
      a phase-locked loop circuit operating in synchronism with said clock signal for generating a frequency-multiplied clock signal from said clock signal to derive polyphase clock signals each having a same period as that of said clock signal, said polyphase clock signals having respective phases differing from each other on a period-by-period basis of said frequency-multiplied clock signal;

first sending means provided at least in a sender node, which is provided by at least one of said nodes, for sending said phase reference signal from said sender node to a receiver node, which is provided by at least one of said nodes, on said phase reference signal bus;

latch clock selecting means provided in at least said receiver node for selecting a latch clock signal from said polyphase clock signals generated by said phase-locked loop circuit based on said received phase reference signal;

second sending means provided in at least said sender node for sending data to said receiver node on said data bus with a delay after said phase reference signal from said sender node;

third sending means provided in at least said sender node for sending said transfer end signal to said receiver node substantially simultaneously with said second sending means; and receiving means provided in at least said receiver node for receiving said data from said data bus by using said latch clock signal.

8. A synchronous data transfer system set forth in claim 7, wherein at least one of said plurality of nodes connected to said phase reference signal bus, said data bus and said transfer end signal bus serves as a bus master with the remaining nodes serving as bus slaves, respectively, and wherein said bus master controls said bus slaves by acquiring said bus privilege for said buses, respectively.

9. A synchronous data transfer system set forth in claim 7, further comprising:

a phase securing circuit connected to said phase reference signal bus, said data bus and said transfer end signal bus for allowing respective waveforms propagating through said buses to rise and/or fall uniformly, to reduce variance in the phase among said propagating waveforms.

10. A synchronous data transfer system set forth in claim 9, wherein said phase securing circuit includes terminating resistors each provided at an end of each of said buses, and matching resistors each connected between each of said nodes and each of said buses, respectively, wherein each terminating resistor has a resistance value coinciding with characteristic impedance of an associated one of said buses, and wherein each matching resistor has a resistance value for a securing difference between characteristic impedance of an associated one of said nodes and characteristic impedance at a connection of said associated bus.

11. A synchronous data transfer system set forth in claim 7, including said phase reference signal bus and said data bus, wherein said transfer end signal bus is provided as a spare bus which is used when needed, and, wherein an end of transfer of said data is detected by comparing a data transfer length determined previously in said system with a value obtained by counting a series of transferred data lengths received by said receiver node.

12. A synchronous data transfer system set forth in claim 11, wherein the node which does not participate in data transfer through said bus detects the end of the data as transferred by comparing the data length determined previously for the data transfer in the transfer system with a value obtained by counting a series of data lengths transferred through said data bus.

13. A synchronous data transfer system set forth in claim 11, wherein said bus privilege arbitration means detects the end of the data transfer by comparing the data length determined previously for the data transfer in the transfer system with a value obtained by counting a series of lengths of the data transferred through said data bus.

14. A synchronous data transfer system set forth in claim 13, said bus privilege arbitration means assigns said bus privilege to said sender node after detection of the end of the data transfer.

15. A synchronous data transfer system set forth in claim 7, wherein said latch clock selecting means includes edge detecting means for detecting an edge of said received phase reference signal to thereby convert the detected edge information into phase information; clock selecting means for selecting from said phase information the clock signal for receiving the data via said data bus to thereby output the selected clock signal as clock selection information; a clock change-over switch for selecting from said clock selection information said polyphase clock signal generated by said phase-locked loop circuit to thereby supply said latch clock signal to latch means provided internally of said receiver node; and a reset circuit for resetting said clock selecting means on the basis of said transfer end signal.

16. A synchronous data transfer system set forth in claim 15, said latch clock selecting means including a plurality of said clock selecting means which are changed over to one to another on the basis of said transfer end signal, and a reset circuit for controlling change-over of the latch clock signal to be supplied to said clock change-over switch.

17. A synchronous data transfer system set forth in claim 15, said clock selecting means including a phase information hold circuit for holding said phase information, a selector for outputting said clock selection information in accordance with said phase information, and a waveform shaper for shaping said clock selection information, wherein said clock selection information is outputted only during a period in which data is valid in the transfer cycle for transferring the data by way of said data bus.

18. A synchronous data transfer system set forth in claim 17, wherein said phase information hold circuit holds said phase information delivered from said edge detecting means while outputting said hold state to said reset circuit for resetting said clock selecting means, said hold state being cleared by the reset signal outputted from said reset circuit.

19. A synchronous data transfer system set forth in claim 15, wherein said edge detecting means includes a sampling circuit for sampling said phase reference signal with said polyphase clock signal, and an edge detecting circuit for detecting an edge of an output signal from said sampling circuit.

20. A synchronous data transfer system set forth in claim 19, said sampling circuit including a number of latch circuits which corresponds to the number of the phases of said polyphase clock signals generated by said phase-locked loop circuit, wherein said phase reference signal is outputted after having been latched by said latch circuit.

21. A synchronous data transfer system set forth in claim 20, wherein said edge detecting circuit detects said edge by comparing a number of the outputs of said latch circuits corresponding to the number of phases of said sampling circuit, to thereby convert the detected edge into the phase information.

22. A synchronous data transfer system, comprising:

a plurality of first nodes for storing data, each first node allows a read/write operation to be performed on said data; and a second node for controlling said first nodes;

wherein said first nodes and said second node are connected to an address bus for transferring addresses of said first nodes from said second node, a command bus for transferring a signal from said second node indicating that a read/write operation is to be performed on data in a first node, a control bus for transferring a signal from said second node for controlling a first node based on a clock signal, a clock bus for transferring a clock signal from said second node for operating a first node, a loop-back clock bus through which a first node transfers the clock signal to said second node by return upon reception of said clock signal, and a data bus for transferring data to or from a first node.

23. A synchronous data transfer system set forth in claim 22, said second node including bus privilege arbitration means for controlling bus privilege for said address bus, said command bus, said control bus, said clock bus and said loop-back clock bus, wherein said bus privilege arbitration means is inhibited from authorizing the bus privilege of said buses for a succeeding data transfer unless signal potentials of said buses have resumed respective high impedance state outputting no data after a series of data transfers between given ones of said plurality of nodes having been completed by using said buses so that no data transfer confliction can occur on said bus or buses shared in common.

24. A synchronous data transfer system set forth in claim 22,
wherein minimum repetition frequencies of said address bus, said command bus, said control bus and said data bus, respectively, a repetition frequency of the clock signal transmitted through said clock bus and a repetition frequency of the clock signal transmitted through said loop-back clock bus bear a relation given by an integral ratio to one another.

25. A synchronous data transfer system set forth in claim 22,
wherein when said first node including said synchronous memory reads the data received by said synchronous memory from said second node, said first node sends out onto said loop-back clock bus one or plural cycles of the clock signals derived from the clock signal for said synchronous memory.

26. A synchronous data transfer system set forth in claim 22, said second nodes including a phase-locked loop circuit operating in synchronism with a predetermined clock signal for generating a frequency-multiplied clock signal from said clock signal to thereby derive as output polyphase clock signals having a same period as that of said clock signal, said polyphase clock signals having respective phases differing from one to another on a period-by-period basis of said frequency-multiplied clock signal;
wherein said second node includes a clock selecting circuit for referencing phase of the loop-back clock signal sent from one node of said plurality of first nodes by way of said loop-back clock bus, to thereby select a latch clock signal from the polyphase clock signals generated by said phase-locked loop circuit on the basis of said phase in order to receive the data from said one first node.

27. A synchronous data transfer system set forth in claim 26, said first node including at least one said synchronous memory and one said address buffer,
wherein said second node holds the set CAS latency written in the register incorporated in the sequencer provided in said synchronous memory, for thereby aligning a time point for starting to latch the data received through said address buffer from said synchronous memory with said selected latch clock signal in accordance with said set CAS latency.

28. A synchronous data transfer system set forth in claim 27, said second node holding the set data transfer length written in said register of said synchronous memory to thereby latch said data by a number of cycles corresponding to said data transfer length from a time point for starting latching of the data received from said synchronous memory by way of said address buffer in accordance with said set data transfer length held by said register.

29. A synchronous data transfer system set forth in claim 27, wherein said second node includes a counter operating in synchronism with said selected latch clock in order to align a time point for starting to latch said received data with a leading cycle of the data received from said synchronous memory through said address buffer.

30. A synchronous data transfer system set forth in claim 22, each first node includes at least one synchronous memory and one address buffer;
said address buffer having input side to which said address bus, said command bus, said control bus and said clock bus are connected, while output side of said address buffer being connected to said synchronous memory by way of an address bus, a command bus, a control bus and a clock bus extending from said buses, respectively, and provided internally of said first node, to allow the signal received at the input side of said address buffer to be transmitted to said synchronous memory;
wherein in said synchronous memory, data on said address bus, said command bus and said control bus, respectively, and data on said data bus are latched with the clock signal transmitted from said second node by way of said clock bus.

31. A synchronous data transfer system set forth in claim 30, said second node selectively controlling said first nodes to execute data read/write operation for said synchronous memory and data read/write operation for a register incorporated in a sequencer provided in said synchronous memory by way of said data bus, wherein write operation for said synchronous memory and write operation for said register are executed in synchronism with the clock signal transmitted through said command bus.

32. A synchronous data transfer system set forth in claim 30, wherein said synchronous memory is at least one selected from a group consisting of a synchronous dynamic random access memory (synchronous DRAM), a synchronous graphic random access memory (SGRAM) and a synchronous static random access memory (synchronous SRAM).

33. A synchronous data transfer system set forth in claim 30, said address bus, said command bus, said control bus and said clock bus being connected to the input side of said address buffer, wherein the sequencer of said address buffer is connected to all of said buses.

34. A synchronous data transfer system set forth in claim 30, wherein said address buffer incorporated in said first node has a function for detecting read operation for reading the data sent from said second node and received at the input side of said address buffer as well as read operation for said register of said sequencer provided in said synchronous memory, to thereby send out onto said loop-back clock bus the clock signal corresponding to a single or plural cycles of said clock bus in dependence on the results of said detection.

35. A synchronous data transfer system set forth in claim 34, wherein said first node sends a series of the read data onto said data bus in accordance with a CAS (column address strobe) latency and the predetermined data transfer length written in said register incorporated in the sequencer provided in said synchronous memory with a delay relative to the loop-back clock signal sent onto said loop-back clock bus.

36. A synchronous data transfer system set forth in claim 34, wherein said address buffer references the data transfer length written in the register of said address buffer to operate in synchronism with a polyphase clock signal outputted from said phase-locked loop circuit in response to said clock signal inputted thereto through said clock bus, to thereby detect the state of said synchronous memory by transiting operation state of said synchronous memory to either one of one-to-one or one-to-plurality or plurality-to-one operation state.

37. A synchronous data transfer system set forth in claim 34, wherein said address buffer includes a combination of at least a phase-locked loop circuit (PLL circuit), a register and a sequencer.

38. A synchronous data transfer system set forth in claim 37, wherein the phase-locked loop circuit of said address buffer generates a frequency-divided clock from said polyphase clock signal inputted to said phase-locked loop circuit or a frequency-multiplied clock thereof to thereby output selectively said frequency-divided clock or said frequency-multiplied clock.

39. A synchronous data transfer system set forth in claim 37, wherein the register of said address buffer cooperates with said register incorporated in the sequencer provided internally of said synchronous memory for writing data in the register of said address buffer simultaneously with write operation for setting said register of said synchronous memory.

40. A synchronous data transfer system set forth in claim 37, wherein the register of said address buffer is provided separately from the register incorporated in said synchronous memory, and wherein the data transfer length is written in the register of said address buffer in accordance with a procedure differing from a write procedure for the register of said synchronous memory.

41. A synchronous data transfer system set forth in claim 37, wherein the sequencer of said address buffer references the data transfer length written in the register of said address buffer to operate in synchronism with the clock signal inputted to said address buffer by way of said clock bus or in synchronism with a polyphase clock signal outputted from said phase-locked loop circuit to which said clock signal is inputted.

* * * * *